United States Patent
Hsieh

(10) Patent No.: US 11,378,444 B2
(45) Date of Patent: Jul. 5, 2022

(54) BIOSENSOR AND BIO DETECTION SYSTEM

(71) Applicant: VisEra Technologies Company Limited, Hsin-Chu (TW)

(72) Inventor: Hsin-Yi Hsieh, Taoyuan (TW)

(73) Assignee: VISERA TECHNOLOGIES COMPANY LIMITED, Hsin-Chu (TW)

( * ) Notice: Subject to any disclaimer, the term of this patent is extended or adjusted under 35 U.S.C. 154(b) by 65 days.

(21) Appl. No.: 16/985,533

(22) Filed: Aug. 5, 2020

(65) Prior Publication Data

US 2022/0042844 A1 Feb. 10, 2022

(51) Int. Cl.
| | | |
|---|---|---|
| G01J 1/04 | (2006.01) | |
| G01N 21/64 | (2006.01) | |
| G01J 1/44 | (2006.01) | |
| G02B 5/30 | (2006.01) | |

(52) U.S. Cl.
CPC .............. *G01J 1/0429* (2013.01); *G01J 1/44* (2013.01); *G01N 21/6486* (2013.01); *G02B 5/3058* (2013.01); *G01J 2001/446* (2013.01)

(58) Field of Classification Search
CPC ...... G01J 1/0429; G01J 2001/446; G01J 1/44; G01N 21/645; G01N 21/6486; G01N 21/64; G01N 2021/6463; G01N 2021/6482; G01N 2021/6471; G02B 5/3058; G02B 5/3025; G02B 5/30
See application file for complete search history.

(56) References Cited

U.S. PATENT DOCUMENTS

| | | | | |
|---|---|---|---|---|
| 9,410,891 | B2 * | 8/2016 | Fehr | G01N 21/03 |
| 9,778,191 | B2 * | 10/2017 | Hsieh | G01N 21/648 |
| 9,909,171 | B2 * | 3/2018 | Joseph | B82Y 30/00 |
| 9,945,782 | B2 * | 4/2018 | Hsieh | G02B 6/005 |
| 10,768,110 | B2 * | 9/2020 | King | B01L 7/52 |
| 10,875,023 | B2 * | 12/2020 | Tsai | B01L 3/5085 |
| 10,957,731 | B1 * | 3/2021 | Hsieh | G01N 21/6454 |
| 11,105,745 | B2 * | 8/2021 | Hsieh | G01N 21/6454 |
| 2002/0004204 | A1 * | 1/2002 | O'Keefe | C12Q 1/6825 435/6.17 |
| 2009/0112482 | A1 * | 4/2009 | Sandstrom | G01N 21/6452 702/19 |
| 2010/0096563 | A1 | 4/2010 | Ponjee et al. | |

(Continued)

FOREIGN PATENT DOCUMENTS

| | | |
|---|---|---|
| JP | 2005249635 A | 9/2005 |
| JP | 2009-300256 A | 12/2009 |

(Continued)

OTHER PUBLICATIONS

Extended European Search Report dated Feb. 22, 2021 in EP Application No. 20196683.5, 8 pages.

(Continued)

*Primary Examiner* — John R Lee
(74) *Attorney, Agent, or Firm* — Muncy, Geissler, Olds & Lowe, P.C.

(57) ABSTRACT

A biosensor is provided. The biosensor includes a substrate, a plurality of photodiodes, a polarizing element and a plurality of reaction sites. The plurality of photodiodes are embedded in the substrate. The polarizing element is disposed on the substrate. The plurality of reaction sites are disposed on the polarizing element.

20 Claims, 24 Drawing Sheets

(56) References Cited

U.S. PATENT DOCUMENTS

| | | | |
|---|---|---|---|
| 2010/0285490 A1* | 11/2010 | Dees | G01N 33/54373 |
| | | | 435/7.1 |
| 2017/0030834 A1* | 2/2017 | Fehr | G01N 21/0303 |
| 2017/0227465 A1* | 8/2017 | Hsieh | G01N 21/6454 |
| 2019/0126281 A1* | 5/2019 | Chu | G01N 21/6452 |
| 2019/0383738 A1 | 12/2019 | Sato et al. | |

FOREIGN PATENT DOCUMENTS

| | | |
|---|---|---|
| JP | 2010522322 A | 7/2010 |
| JP | 2014-92485 A | 5/2014 |
| JP | 2016-200504 A | 12/2016 |
| JP | 2020008682 A | 1/2020 |

OTHER PUBLICATIONS

Office Action of JP Application No. 2020-211504, dated Dec. 14, 2021, 4 pages.
The Final Office Action of its corresponding JP application No. 2020-211504 dated Apr. 12, 2022.

\* cited by examiner

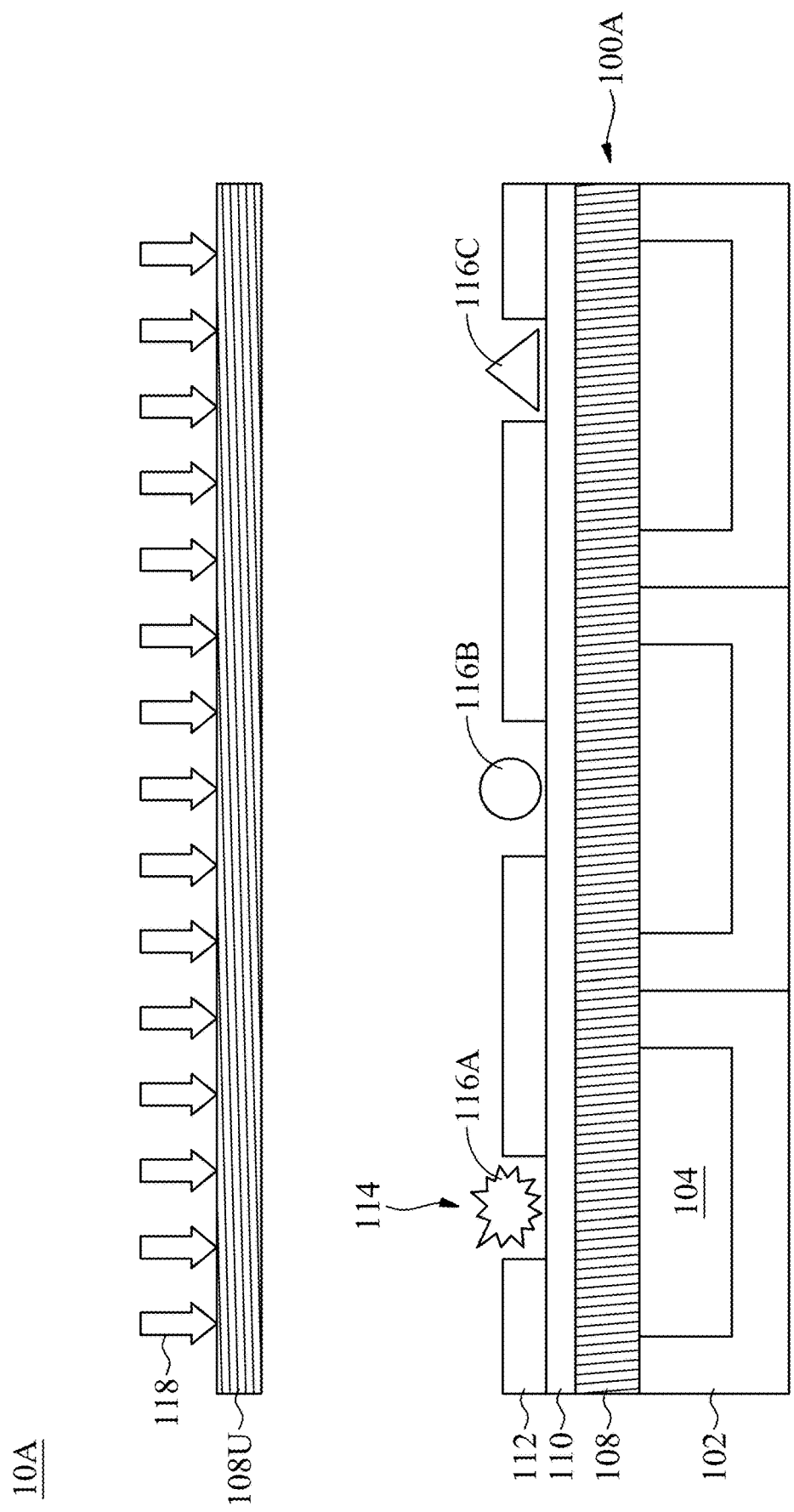

BIOSENSOR AND BIO DETECTION SYSTEM

BACKGROUND OF THE INVENTION

Field of the Invention

The present invention relates to a biosensor and a bio detection system, and in particular, it relates to a biosensor with a polarizing element and a bio detection system with a polarizing element.

Description of the Related Art

An integrated sensing device has recently been used for biological analysis. When using such an application, a biological or biochemical sample may be placed on a photodiode. The bioreaction or interaction, such as DNA sequencing, immunofluorescence detection, may be reported through the excitation or emission spectrum and/or the intensity of a fluorescent molecule. The fluorescence may be excited by a shorter excitation wavelength and generate a longer emission light toward the photodiode. The spectrum distribution and intensity of the fluorescence may be detected and determined by the photodiode.

Many integrated biosensing devices have been designed to be embedded with such light filters as an interference filter, an absorption filter, or a plasmonic filter. Those filters usually block the excitation light and let the emission light pass, but their transmittance spectra are fixed, and are based on their design. This may be affected by their film thickness and stacks, pigment, or nanostructure geometry. When many fluorescent molecules need to be detected, different excitation lights, all at different wavelengths, are needed. However, it is difficult to adjust the transmittance wavelength of the embedded filter in the integrated device, which limits the applications.

As a result, a novel biosensor and a novel bio detection system that have more flexible excitation light-blocking properties are needed.

BRIEF SUMMARY OF THE INVENTION

The biosensor and the bio detection system of the present invention can prevent a photodiode from receiving an excitation light by using a polarizing element. The excitation light passes through the upper polarizing element, and a polarizing element is disposed on the photodiode. The polarization angle of the upper polarizing element is different from that of the polarizing element. After the excitation light passes through the upper polarizing element, the excitation light is converted to polarize at the same polarization angle as that of the upper polarizing element. Since the excitation light polarizes at a polarization angle that is different from that of the polarization element on the photodiode, the excitation light cannot pass through the polarization element. Therefore, the photodiode can be prevented from receiving the excitation light. In addition, instead of designing various biosensors or bio detection systems that target various excitation lights, one biosensor or one bio detection system of the present invention is enough to block various excitation lights.

A biosensor is provided in accordance with some embodiments of the present invention. The biosensor includes a substrate, a plurality of photodiodes, a polarizing element and a plurality of reaction sites. The plurality of photodiodes are embedded in the substrate. The polarizing element is disposed on the substrate. The reaction sites are disposed on the polarizing element.

A bio detection system is provided in accordance with some embodiments of the present invention. The bio detection system includes a substrate, a plurality of photodiodes, a polarizing element, a plurality of reaction sites, an upper polarizing element and an excitation light source. The plurality of photodiodes are embedded in the substrate. The polarizing element is disposed on the substrate. The reaction sites are disposed on the polarizing element. The upper polarizing element is disposed on the reaction sites. The excitation light source is disposed on the upper polarizing element and emits an excitation light that passes through the upper polarizing element.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 2A illustrates an application of a bio detection system in accordance with some embodiments.

DETAILED DESCRIPTION OF THE INVENTION

Figure 1A:
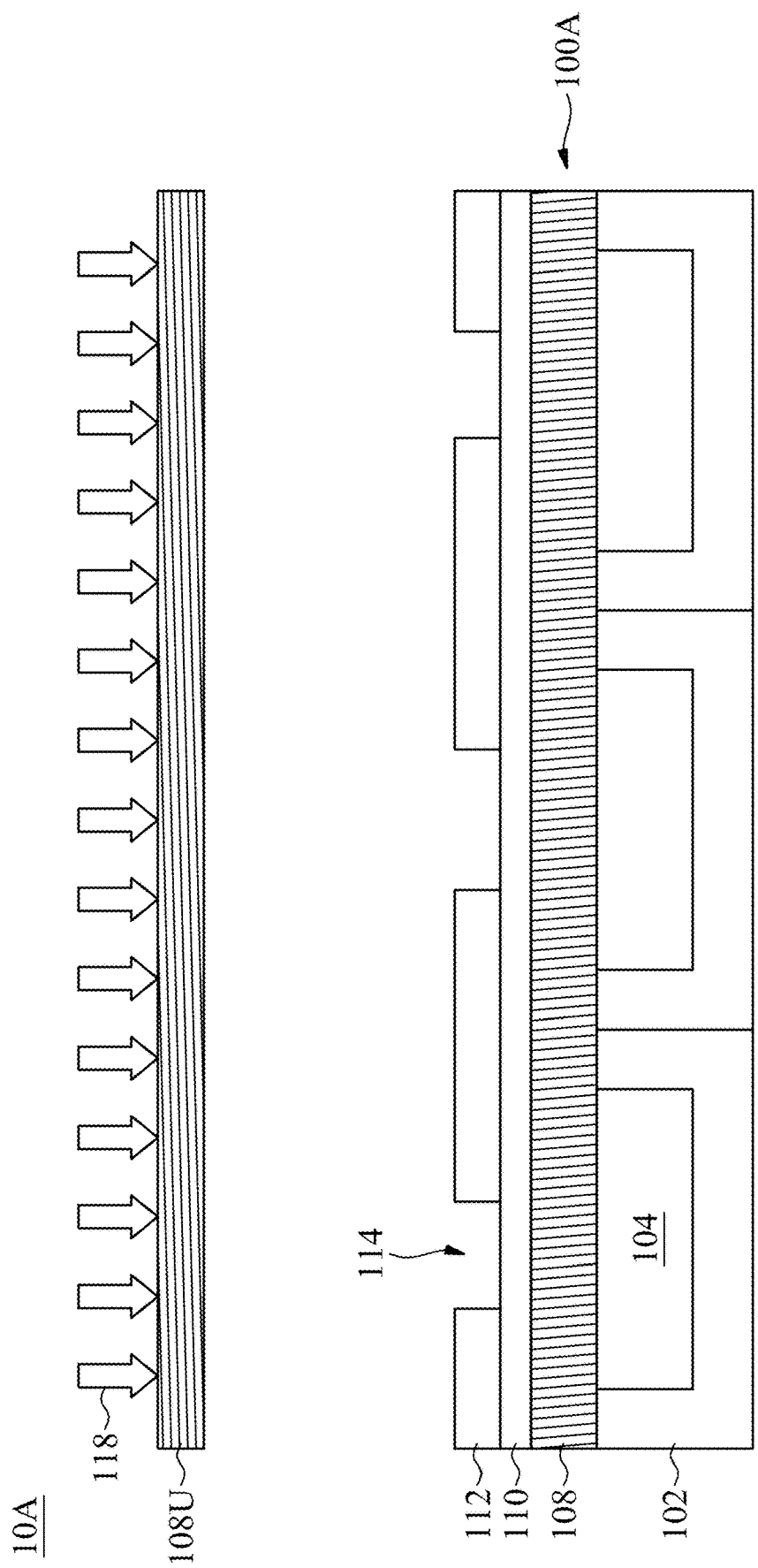
FIG. 1A illustrates a cross-sectional view of a bio detection system in accordance with some embodiments.

The biosensor and the bio detection system of the present invention are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. In addition, in this specification, expressions such as "first material layer disposed on/over a second material layer", may indicate the direct contact of the first material layer and the second material layer, or it may indicate a non-contact state with one or more intermediate layers between the first material layer and the second material layer. In the above situation, the first material layer may not be in direct contact with the second material layer.

In addition, in this specification, relative expressions are used. For example, "lower", "bottom", "upper" or "top" are used to describe the position of one element relative to another. It should be appreciated that if a device is flipped upside down, an element that is "lower" will become an element that is "upper".

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed as referring to the orientation as described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section discussed below could be termed a second element, component, region, layer, portion or section without departing from the teachings of the present disclosure.

Herein, the terms "about", "around" and "substantially" typically mean +/−20% of the stated value or range, typically +/−10% of the stated value or range, typically +/−5% of the stated value or range, typically +/−3% of the stated value or range, typically +/−2% of the stated value or range, typically +/−1% of the stated value or range, and typically +/−0.5% of the stated value or range. The stated value of the present disclosure is an approximate value. Namely, the meaning of "about", "around" and "substantially" may be implied if there is no specific description of "about", "around" and "substantially".

FIG. 1A illustrates a cross-sectional view of a bio detection system 10A for bio detection in accordance with some embodiments. Referring to FIG. 1A, the system 10A includes a biosensor 100A, an upper polarizing element 108U and an excitation light source 118. The biosensor 100A essentially includes a substrate 102, a photodiode 104, a polarizing element 108, a planarization layer 110 and a sample isolation layer 112. The sample isolation layer 112 has a plurality of openings as reaction sites 114 for bio-samples immobilization.

The substrate 102 is embedded with the photodiode 104. In some embodiments of the present disclosure, the substrate 102 is a bulk semiconductor substrate, such as a semiconductor wafer. For example, the substrate 102 is a silicon wafer. The substrate 102 may include silicon or another elementary semiconductor material such as germanium. In some other embodiments, the substrate 102 includes a compound semiconductor. The compound semiconductor may include gallium arsenide, silicon carbide, indium arsenide, indium phosphide, another suitable material, or a combination thereof, but is not limited thereto.

In some embodiments, the substrate 102 includes a semiconductor-on-insulator (SOI) substrate. The SOI substrate may be fabricated using a separation by implantation of oxygen (SIMOX) process, a wafer bonding process, another applicable method, or a combination thereof, but is not limited thereto. In some embodiments, the substrate 102 is an un-doped substrate.

The polarizing element 108 is disposed on the substrate 102, and the reaction sites 114 are disposed on the polarizing element 108. The polarizing element 108 has a polarization angle, which means that the light polarizing at an angle of 90-degree shift or perpendicular to the polarization angle of the polarizing element 108 cannot pass through the polarizing element 108. The polarizing element 108 includes a layer of metal wire grating with a film thickness of about 100-300 nm, a period of about 20-400 nm, and a filling ratio (or duty cycle) of about 0.2-0.8. The orientation of grating ridge mainly affects the transmission percentage of a polarized light. For example, when the polarized light is parallel, 45-degree shifted, or 90-degree shifted, to the orientation of the polarizing element 108, the transmission light intensity after the polarizing element is the highest, about 50%, or minimum, respectively. Therefore, when the excitation light is a polarized light with 90-degree shift to the polarizing element, the polarizing element under the reaction sites will block the polarized light passing through the polarizing element 108. Meanwhile, bioreaction reporters (such as fluorescent dyes) in the reaction sites can be excited and emit fluorescent signals that could partially pass through the polarizing element for photodiode detection. The extinction ratio of the blocking efficiency is further affected by the film thickness, grating period, and filling ratio of the metal wire. It has been demonstrated in Peng Li et al. "Investigation of achromatic micro polarizer array for polarization imaging in visible-infrared band." Optik, vol 158, April 2018, pp. 1427-1435 t that the extinction ratio could reach $10^4$ (equivalent to an optical density (OD) of 4) using aluminum wire with a thickness of 160 nm, a filling ratio of 0.5, and a period of 150 nm. Various parameters corresponding to an extinction ratio ranging from 100 to 108 were also simulated in their study. A light illumination system with an optical density of larger than 3 for blocking the excitation light is sufficient to be practiced for bio sensing applications. In some embodiments, the polarizing element 108 includes one, two, three or four sub-polarizing layers with different orientations. The material of the polarizing element 108 may be an opaque material, such as aluminum (Al), titanium (Ti), niobium (Nb) or a combination thereof. Note that when the polarizing element 108 includes only one sub-polarizing layer, it means that the polarizing element 108 is essentially the sub-polarizing layer.

The planarization layer 110 is disposed on the polarizing element 108. The planarization layer 110 may be formed by using sputtering, spin-coating, chemical vapor deposition (CVD), low-pressure chemical vapor deposition (LPCVD), low-temperature chemical vapor deposition (LTCVD), rapid thermal chemical vapor deposition (RTCVD), plasma enhanced chemical vapor deposition (PECVD), atomic layer deposition (ALD), physical vapor deposition process, molecular beam deposition process, any other suitable process or a combination thereof, but is not limited thereto. The planarization layer 110 may protect the photodiode 104 from delamination, corrosion, or damage. Specifically, the planarization layer 110 may prevent the solution of the sample from contacting the photodiode 104. The material of the planarization layer 110 includes metal oxides, metal nitrides, silicon oxides, silicon nitrides or a combination thereof, but is not limited thereto. In some embodiments, the metal oxides, or metal nitrides, silicon oxides, or silicon nitrides may include, but are not limited to, silicon oxide (e.g., $SiO_2$), titanium oxide (e.g., $TiO_2$), tantalum oxide (e.g., $Ta_2O_5$), aluminum oxide (e.g., $Al_2O_3$), niobium oxide (e.g., $Nb_2O_5$), silicon nitride (e.g., $Si_3N_4$), titanium nitride, tantalum nitride, or a combination thereof. In addition, the planarization layer 110 may be coated or treated with self-assembly monolayers (SAMs), functional polymers, or hydrogels for biosample immobilization. In accordance with some embodiments, the material of the planarization layer 110 may be transparent or semi-transparent.

The sample isolation layer 112 is disposed on the planarization layer 110. The sample isolation layer 112 may be formed by using sputtering, spin-coating, chemical vapor deposition (CVD), low-pressure chemical vapor deposition (LPCVD), low-temperature chemical vapor deposition (LTCVD), rapid thermal chemical vapor deposition (RTCVD), plasma enhanced chemical vapor deposition (PECVD), atomic layer deposition (ALD), physical vapor deposition process, molecular beam deposition process, any other suitable process or a combination thereof, but is not limited thereto. In addition, the sample isolation layer 112 may be coated or treated with self-assembly monolayers (SAMs), functional polymers, or hydrogels for biosample rejection. In accordance with some embodiments, the material of the sample isolation layer 112 may be transparent, semi-transparent, or opaque.

The material of the sample isolation layer 112 includes metal, metal alloy, metal oxides, metal nitrides, silicon, silicon oxides, silicon nitrides, or a combination thereof, but is not limited thereto. In some embodiments, the metal, metal alloy, metal oxides, metal nitrides, silicon, silicon oxides, silicon nitrides may include, but are not limited to, silver (Ag), aluminum (Al), gold (Au), niobium (Nb), titanium (Ti), tungsten (W), an alloy thereof, silicon (e.g., Si:H), silicon oxide (e.g., $SiO_2$), titanium oxide (e.g., $TiO_2$), tantalum oxide (e.g., $Ta_2O_5$), aluminum oxide (e.g., $Al_2O_3$), niobium oxide (e.g., $Nb_2O_5$), silicon nitride (e.g., $Si_3N_4$), titanium nitride, tantalum nitride, or a combination thereof. The sample isolation layer 112 includes a plurality of reaction sites 114. In some embodiments, each of the reaction sites 114 may be an opening in the sample isolation layer 112 as shown in FIG. 1. Therefore, the bottom surface of the reaction site 114 may be the top surface of the planarization layer 110. When the material of the sample isolation layer 112 is different from that of the planarization layer 110, a selective surface coating can be performed to modify the planarization layer 110 with a functional group that may be able to capture biosamples and to modify the sample isolation layer 112 with another functional group that may not be able to capture the biosamples. Thus, the biosamples can be localized in the reaction site 114.

In other embodiments, the sample isolation layer 112 may not have an opening as the reaction site 114. The reaction site 114 may be formed by modifying a portion of the surface of the sample isolation layer 112 so that only a certain region can capture desired biosamples. For example, some of the functional group on the surface of the sample isolation layer 112 may be modified to be able to capture the desired biosamples. In some embodiments, the reaction site 114 may correspond to one, two or four photodiodes 104.

The bio detection system 10A also includes an upper polarizing element 108U and an excitation light source 118. The upper polarizing element 108U is disposed on the reaction sites 114. The upper polarizing element 108U has a polarization angle different from that of the polarizing element 108. For example, the polarization angle of the upper polarizing element 108U is perpendicular to that of the polarizing element 108. In some embodiments, the polarization angle of the polarizing element 108 is 0 degrees and the polarization angle of the upper polarizing element 108U is 90 degrees. In some embodiments, the upper polarizing element 108U includes one, two, three or four sub-upper polarizing elements. Note that when the upper polarizing element 108U includes only one sub-upper polarizing element, it means that the upper polarizing element 108U is essentially the sub-upper polarizing element.

The excitation light source 118 is disposed on the upper polarizing element 108U. The excitation light source 118 may emit an excitation light. In some embodiments, the excitation light includes one, two, three or four sub-excitation light sources. Note that when the excitation light source 118 includes only one sub-excitation light source, it means that the excitation light source 118 is essentially the sub-excitation light source. In some embodiments, the sub-excitation light sources do not emit lights simultaneously. For example, the sub-excitation light sources may emit lights sequentially. Alternatively, the sub-excitation light sources may emit lights in groups. In some embodiments, the excitation light source 118 is a monochromator that continuously emits lights from a short wavelength to a long one (or from a long wavelength to a short one). For example, the monochromator emits lights with wavelengths ranging from 100 nm to 1000 nm.

The biosensor 100A and the bio detection system 10A according to the present invention can prevent the photodiodes from receiving the excitation light by using the polarizing elements. The excitation light passes through the upper polarizing element, and the polarizing element is disposed on the photodiode. The polarization angle of the upper polarizing element is different from that of the polarizing element. After the excitation light passes through the upper polarization element, there is only the excitation light with the same polarization angle as that of the upper polarizing element left. Since the excitation light polarizes at a polarization angle that is different from that of the polarization element, the excitation light cannot pass through the polarization element. Therefore, the photodiode can be prevented from receiving the excitation light. In addition, instead of designing various biosensors or bio detection systems that target various excitation lights, respectively, one biosensor or one bio detection system of the present invention is good enough to block various excitation lights.

Figure 1B:
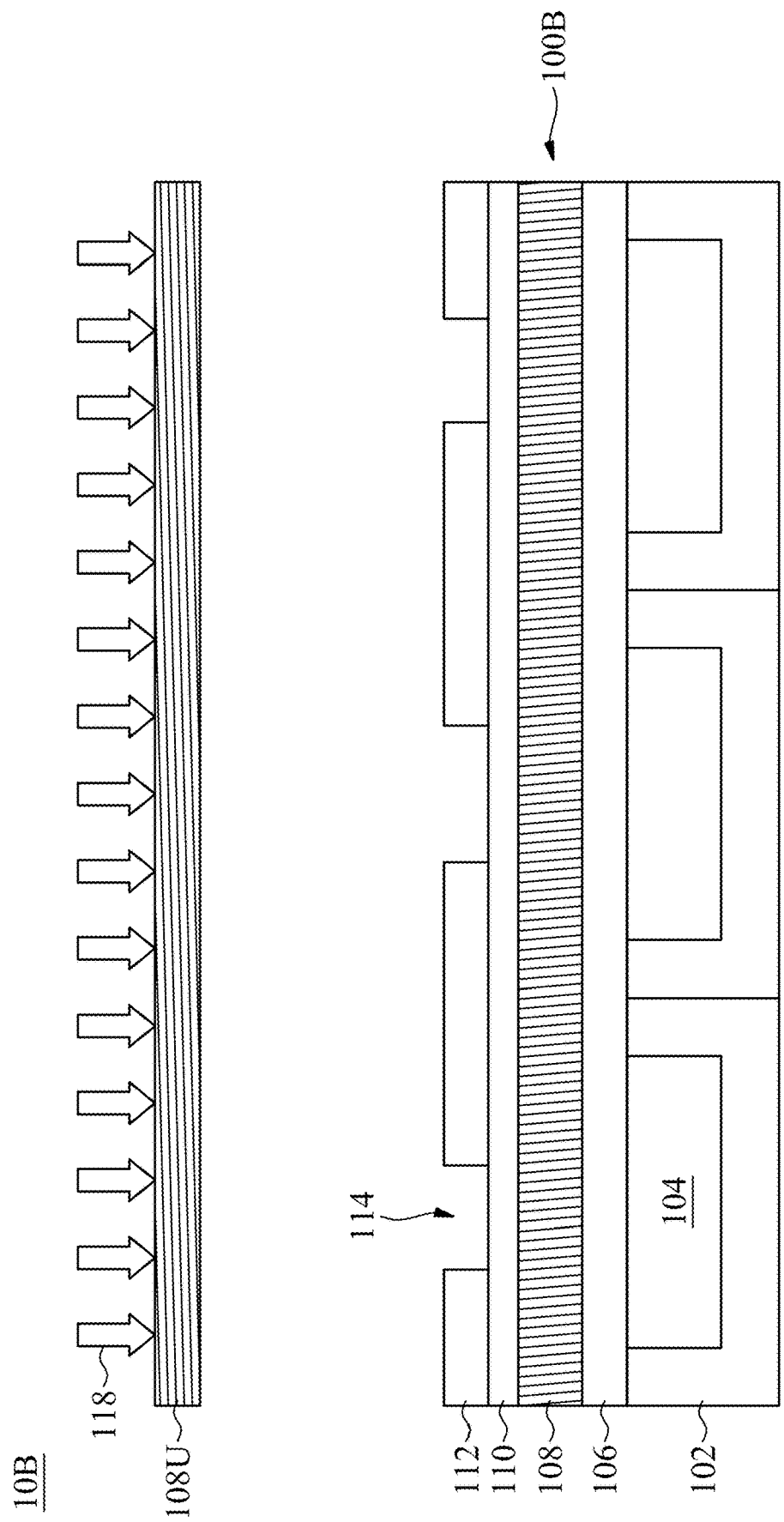
FIG. 1B illustrates a cross-sectional view of a bio detection system in accordance with some embodiments.

FIG. 1B illustrates a cross-sectional view of a bio detection system 10B in accordance with some embodiments. Note that the same or similar elements or layers are denoted by like reference numerals. In some embodiments, the same or similar elements or layers denoted by like reference numerals have the same meaning and will not be repeated, for the sake of brevity.

One of the differences between the bio detection system 10B and the bio detection system 10A is that the biosensor 100B further includes a filter layer 106. The filter layer 106 is disposed on the substrate 102. Specifically, the filter layer 106 is disposed between the polarizing element 108 and the substrate 102. In some embodiments, the filter layer 106 includes one, two, three or four sub-filter layers. Note that when the filter layer 106 includes only one sub-filter layer, it means that the filter layer 106 is essentially the sub-filter layer.

Figure 1C:
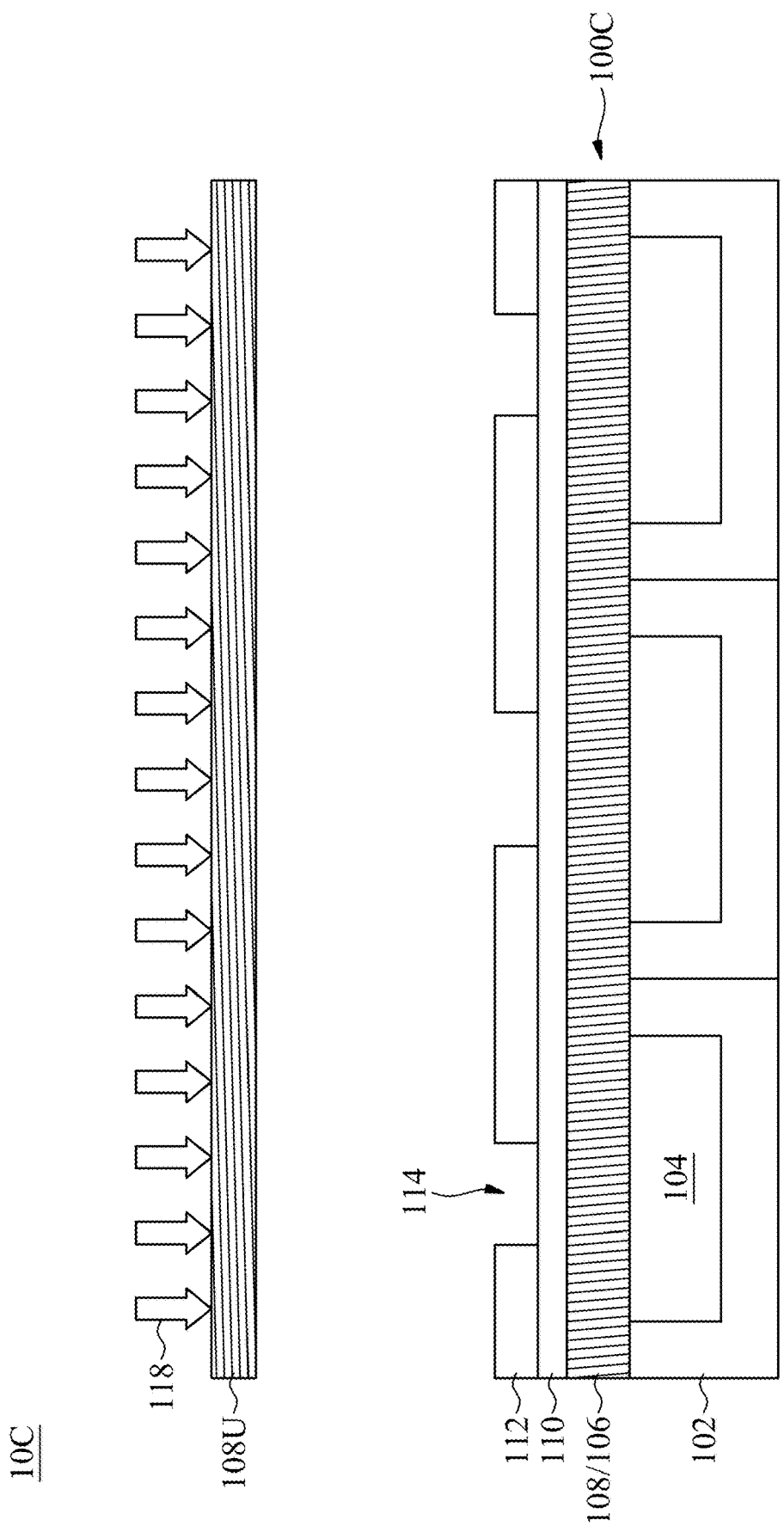
FIG. 1C illustrates a cross-sectional view of a bio detection system for bio detection in accordance with some embodiments.

FIG. 1C illustrates a cross-sectional view of a bio detection system 10C in accordance with some embodiments. Note that the same or similar elements or layers are denoted by like reference numerals. In some embodiments, the same or similar elements or layers denoted by like reference numerals have the same meaning and will not be repeated, for the sake of brevity.

One of the differences between the bio detection system 10C and the bio detection system 10B is that the polarizing element 108 of the biosensor 100C is embedded in the filter layer 106.

The applications of various bio detection systems are described hereinafter.

FIG. 2A illustrates an application of the bio detection system 10A in accordance with some embodiments. A biosample 116A, a biosample 116B and a biosample 116C are placed in the reaction sites 114, respectively, as shown in FIG. 2A. In some embodiments, the biosample 116A, the biosample 116B and the biosample 116C may include DNA molecules, peptides, proteins or the like or a combination thereof. In the embodiments, one reaction site 114 corresponds to one photodiode 104.

The application of DNA sequencing is taken as an example. The biosample 116A, the biosample 116B and the biosample 116C are DNA molecules with different DNA sequence and are immobilized in different reaction sites. The deoxyribonucleoside triphosphates (dNTPs), such as deoxyadenosine triphosphate (dATP), deoxythymidine triphosphate (dTTP), deoxyguanosine triphosphate (dGTP) and deoxycytidine triphosphate (dCTP), are labeled with the same fluorescent marker such as Alexa 488, which is referred to as dNTP-Alexa 488, dATP-Alexa 488, dTTP-Alexa 488, dGTP-Alexa 488 and dCTP-Alexa 488. Alexa 488 can be excited by a light with a wavelength of 488 nm. Only one of the dNTPs-Alexa 488 is used in each flow cycle. In the first cycle, a solution of dATP-Alexa 488 and polymerase is flowed through the bio detection system 10A. The polymerase can attach one nucleotide based on the A-T or G-C pairing to the template DNA. Thus, when the new synthesized base of the DNA template in the reaction sites is T, the dATP-Alexa 488 will be added to the complementary DNA primer and the complementary DNA primer will be extended. Besides, by using a 3'-cap to block continuously DNA synthesizing, at most one base can be added in each flow cycle. The excitation light source 118 excites the biosamples 116A, 116B and 116C with a light having a wavelength of 488 nm. If one photodiode 104 receives the emission light of Alexa 488, it can be learned that the biosample 116A in the reaction site 114 above the photodiode 104 is bound by one dATP-Alexa 488. Then, the fluorescent marker Alexa 488 and the 3'-cap on the dATP is removed for a new flow cycle. In the second cycle, a solution of dGTP-Alexa 488 is flowed through the bio detection system 10A. Then, the excitation light source 118 excites the biosamples 116A, 116B and 116C. If one photodiode 104 receives the emission light of Alexa 488, it can be learned that the biosample 116A in the reaction site 114 above the photodiode 104 is bound by one dGTP-Alexa 488. Then, the fluorescent marker Alexa 488 and the 3'-cap on the dGTP is removed. Then, the third cycle using a solution of dCTP-Alexa 488, and the fourth cycle using a solution of dTTP-Alexa 488 are performed. After about 100-1200 cycles are repeated, the DNA sequences of the biosamples 116A, 116B and 116C are determined.

Figure 2B:
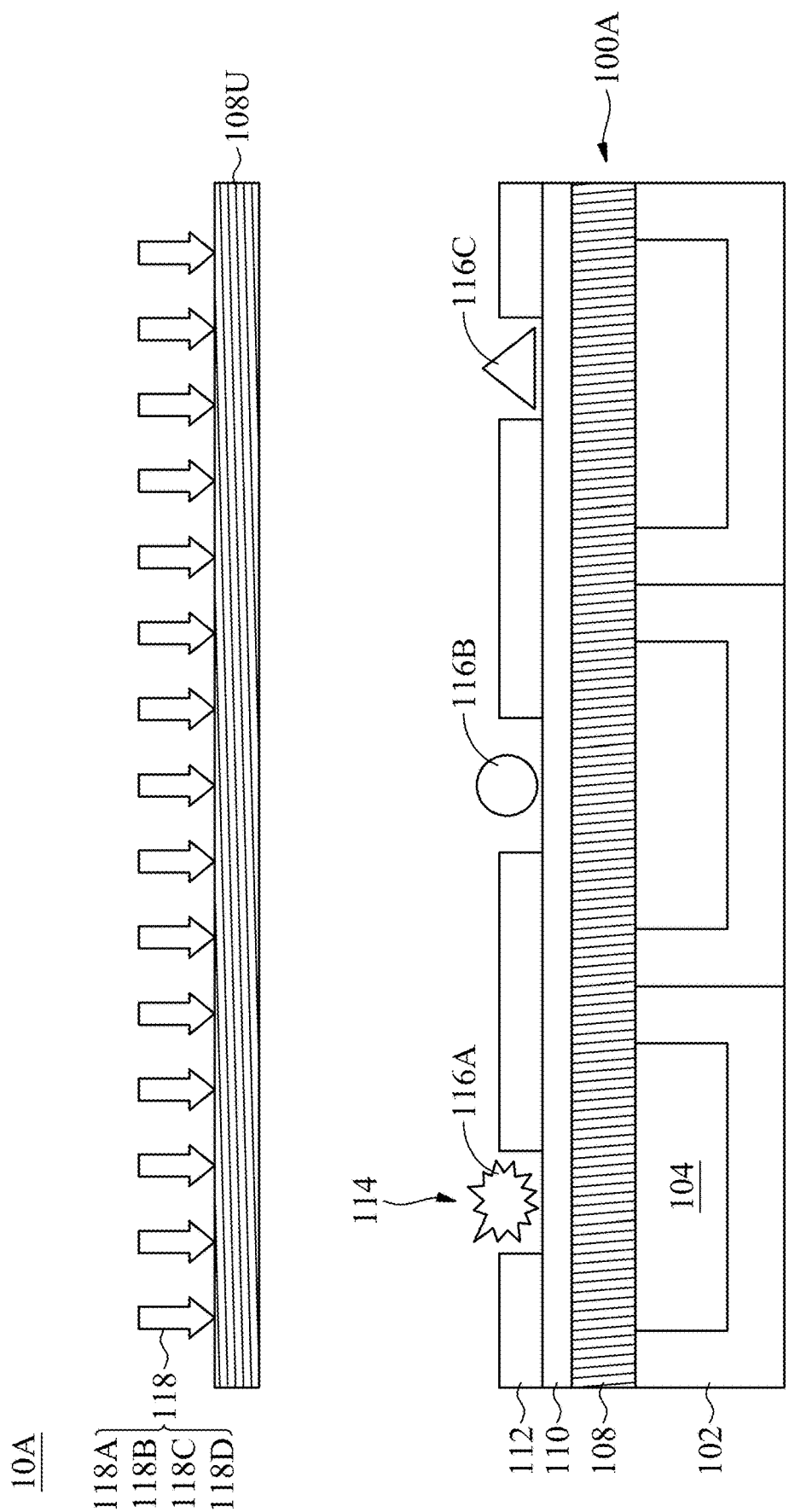
FIG. 2B illustrates an application of a bio detection system in accordance with some embodiments.

FIG. 2B illustrates an application of the bio detection system 10A in accordance with some embodiments. Note that the same or similar elements or layers are denoted by like reference numerals. In some embodiments, the same or similar elements or layers denoted by like reference numerals have the same meaning and will not be repeated, for the sake of brevity.

One of the differences between FIG. 2B and FIG. 2A is that the excitation light source 118 of FIG. 2B includes four sub-excitation light sources 118A, 118B, 118C and 118D. The sub-excitation light sources 118A, 118B, 118C and 118D emit different lights from that of each other. The application of DNA sequencing is taken as an example. dATP, dTTP, dGTP and dCTP are labeled with four different fluorescent markers, respectively, and each of the four different fluorescent markers can only be excited by the respective excitation light. For example, dATP is labeled with Alexa 405 (referred to as dATP-Alexa 405), dTTP is labeled with Alexa 488 (referred to as dTTP-Alexa 488), dGTP is labeled with Alexa 555 (referred to as dGTP-Alexa 555), and dCTP is labeled with Alexa 647 (referred to as dCTP-Alexa 647).

Figure 2C:
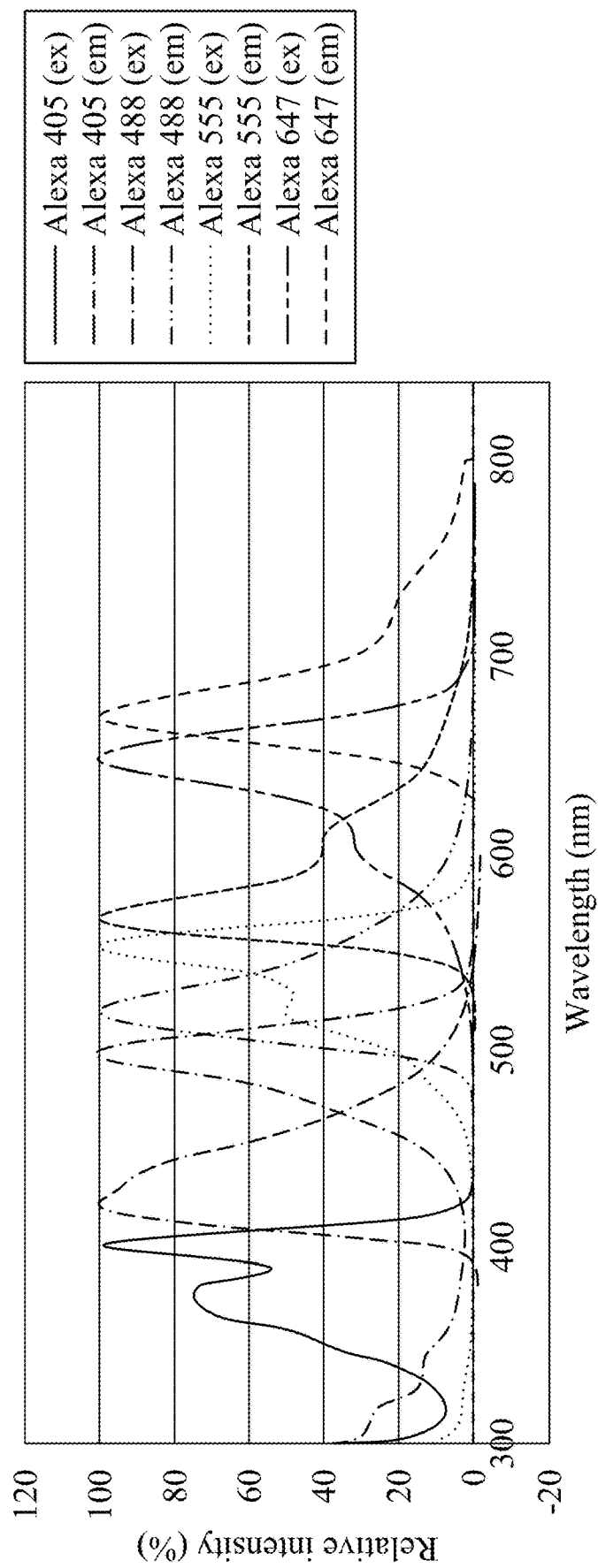
FIG. 2C illustrates the excitation spectrums and the emission spectrums of Alexa 405, Alexa 488, Alexa 555 and Alexa 647.

FIG. 2C illustrates the excitation spectrums and the emission spectrums of Alexa 405, Alexa 488, Alexa 555 and Alexa 647. As shown in FIG. 2C, Alexa 405 can be excited by a light with a wavelength of 405 nm. Alexa 488 can be excited by a light with a wavelength of 488 nm. Alexa 555 can be excited by a light with a wavelength of 555 nm. Alexa 647 can be excited by a light with a wavelength of 647 nm. In each cycle, two, three or four of the dATP-Alexa 405, the dTTP-Alexa 488, the dGTP-Alexa 555 and the dCTP-Alexa 647 and polymerase are flowed through the bio detection system 10A. Then, the sub-excitation light sources 118A, 118B, 118C and 118D sequentially excite the biosamples 116A, 116B and 116C. If one photodiode 104 receives the emission light of Alexa 405, it can be learned that the biosample in the reaction site 114 above the photodiode 104 is bound by one dATP-Alexa 405. If one photodiode 104 receives the emission light of Alexa 488, it can be learned that the biosample in the reaction site 114 above the photodiode 104 is bound by one dTTP-Alexa 488. If one photodiode 104 receives the emission light of Alexa 555, it can be learned that the biosample in the reaction site 114 above the photodiode 104 is bound by one dGTP-Alexa 555. If one photodiode 104 receives the emission light of Alexa 647, it can be learned that the biosample in the reaction site 114 above the photodiode 104 is bound by one dTTP-Alexa 647. Then, the fluorescent markers and the 3'-cap are removed. After about 50-600 cycles are repeated, the DNA sequences of the biosamples 116A, 116B and 116C are determined.

Figure 2D:
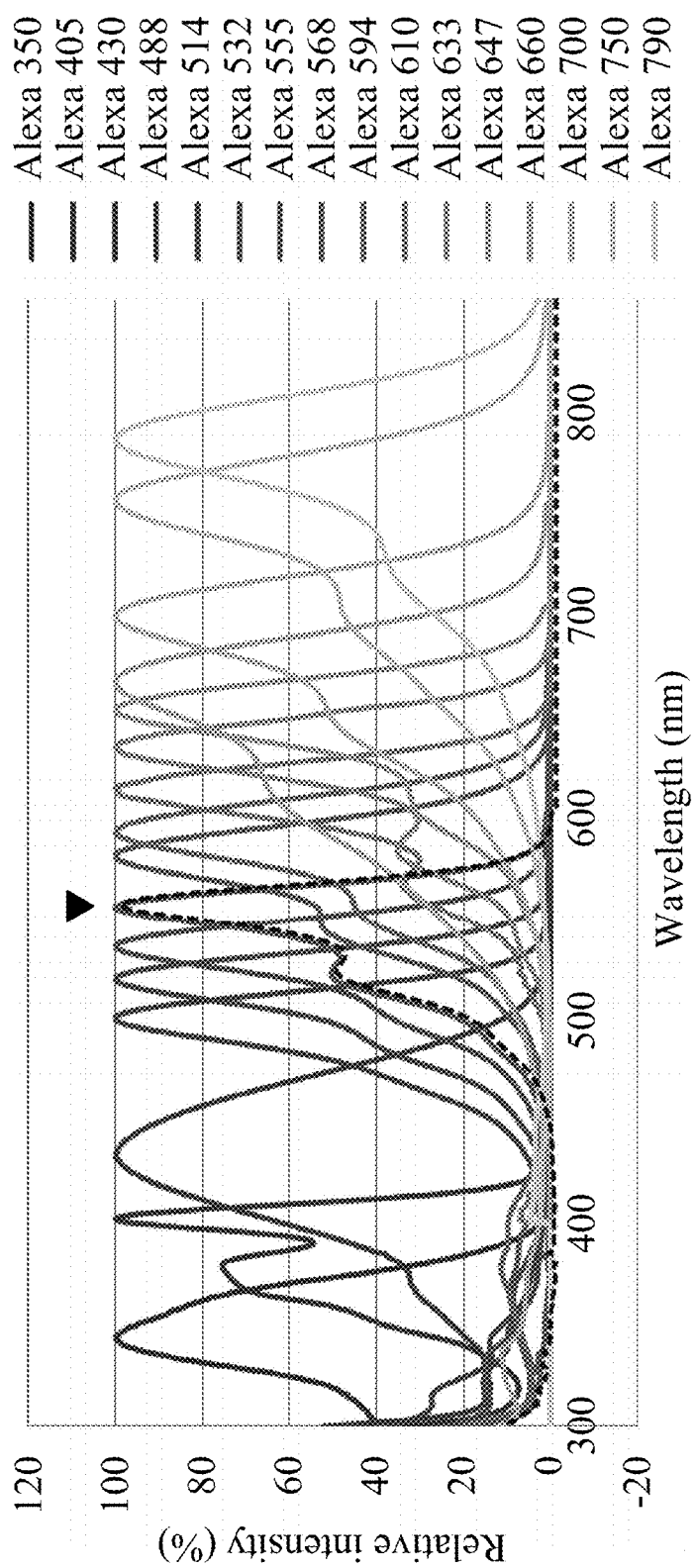
FIG. 2D illustrates the excitation spectrums of a plurality of fluorescent markers

In the embodiments, fewer cycles are required to determine the same length of a DNA molecule. FIG. 2D illustrates the excitation spectrums of a plurality of fluorescent markers. In these embodiments, referring to the bio detection system 10A of FIG. 2B, the excitation light source 118 is a monochromator. The monochromator can emit lights from a short wavelength to a long wavelength (or from a long wavelength to a short one) over time. In some embodiments, the monochromator can emit lights with wavelengths ranging from 250 nm to 900 nm, at an interval of, such as 1 nm, 2 nm, 5 nm or 10 nm. The number of the fluorescent markers can be 1, 2, 3, 4, 5, 6, 7, 8, 9, 10, 11, 12, 13, 14, 15 or 16, but not limited thereto.

As shown in FIG. 2D, the fluorescent markers can be Alexa 350, Alexa 405, Alexa 430, Alexa 488, Alexa 514, Alexa 532, Alexa 555, Alexa 568, Alexa 594, Alexa 610, Alexa 633, Alexa 647, Alexa 660, Alexa 700, Alexa 750 and Alexa 790. For example, the excitation light source 118 emits lights with wavelengths ranging from 250 nm to 900 nm over time. When one photodiode 104 obtains a signal intensity versus excitation light wavelength profile as indicated by the arrow and shown by the dotted line in FIG. 2D, it can be learned that the fluorescent marker in the reaction site is Alexa 555. Therefore, in the embodiments, more fluorescent markers can be distinguished.

Figure 3A:
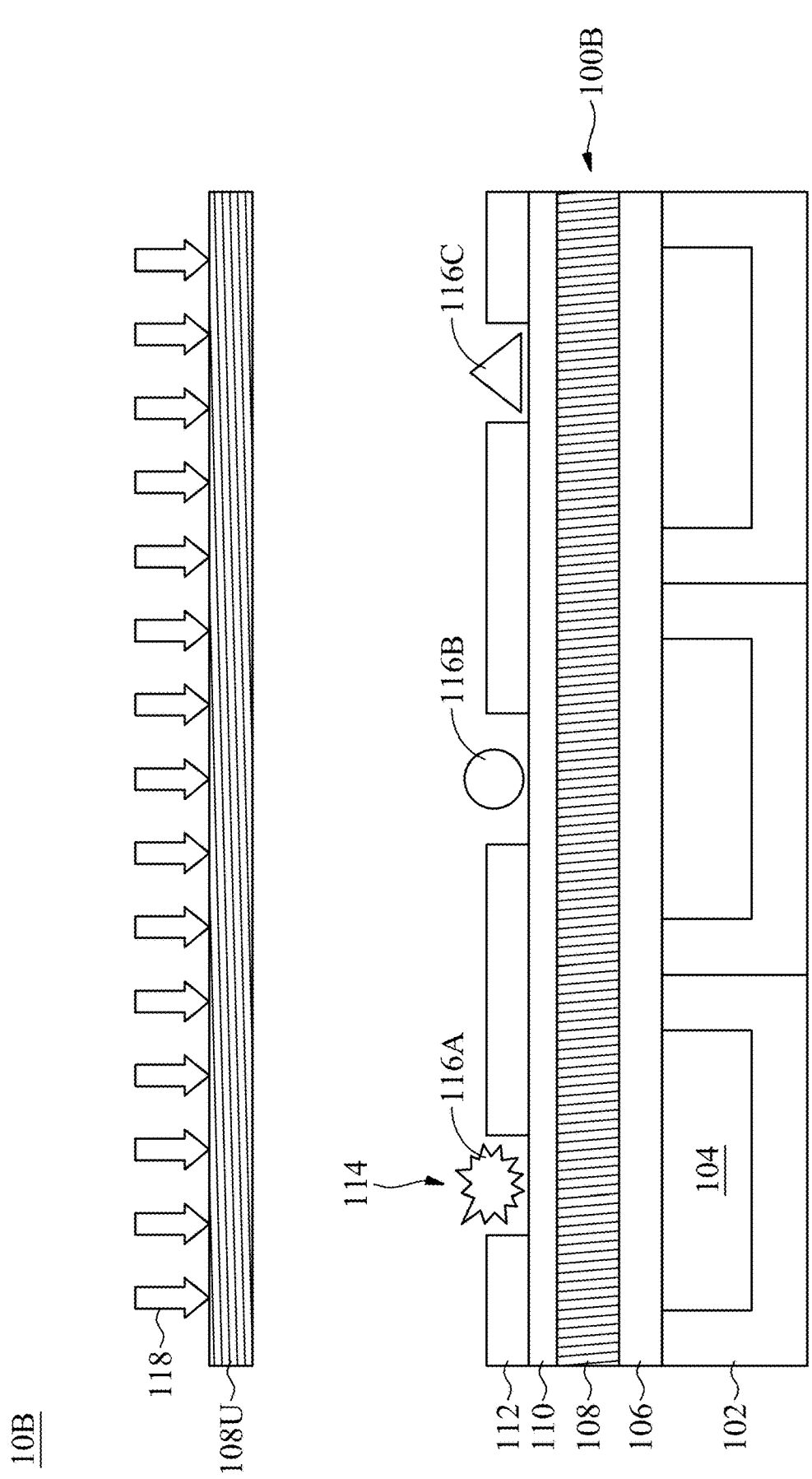
FIG. 3A illustrates an application of a bio detection system in accordance with some embodiments.

FIG. 3A illustrates an application of the bio detection system 10B in accordance with some embodiments. Note that the same or similar elements or layers are denoted by like reference numerals. In some embodiments, the same or similar elements or layers denoted by like reference numerals have the same meaning and will not be repeated, for the sake of brevity. The application and description of the bio detection system 10B is similar to those described in the paragraphs relating to FIG. 2A, which will not repeated herein.

One of the differences between FIG. 3A and FIG. 2A is that the biosensor 100B further includes a filter layer 106 disposed on the substrate 102. Specifically, the filter layer 106 is disposed between the substrate 102 and the polarizing element 108. The filter layer 106 may be an IR cut filter, such as a 940 nm shortpass filter or a 700 nm shortpass filter. Therefore, the photodiodes 104 can be further prevented from receiving a signal from a long wavelength of light that is out of the emission wavelength of target fluorescent dyes (e.g. IR light from the environment) in the embodiments.

Figure 3B:
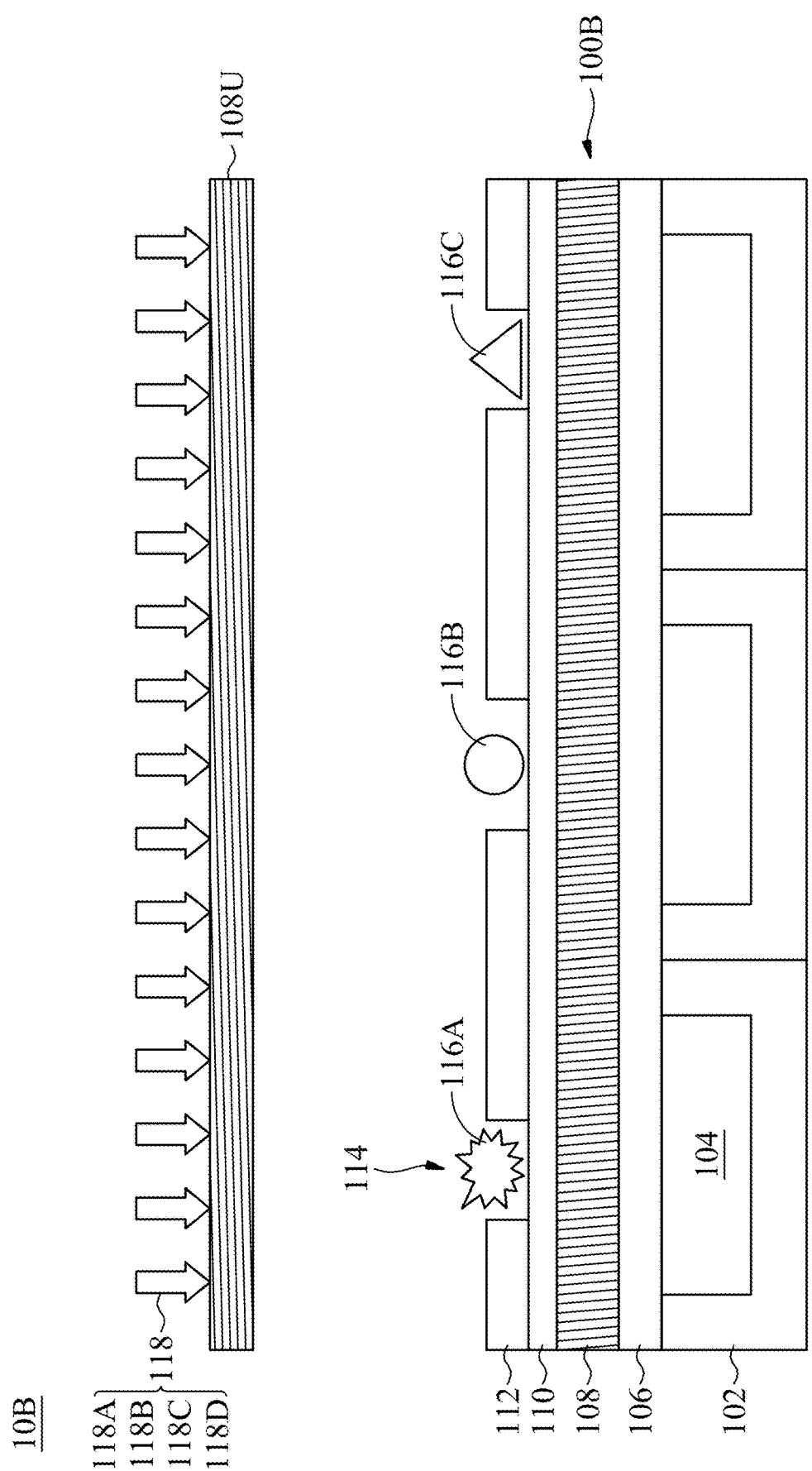
FIG. 3B illustrates an application of a bio detection system in accordance with some embodiments.

FIG. 3B illustrates an application of the bio detection system 10B in accordance with some embodiments. Note that the same or similar elements or layers are denoted by like reference numerals. In some embodiments, the same or similar elements or layers denoted by like reference numerals have the same meaning and will not be repeated, for the sake of brevity. The application and description of the bio detection system 10B is similar to those described in the paragraphs relating to FIGS. 2B, 2C and 2D, which will not be repeated herein.

One of the differences between FIG. 3B and FIGS. 2B, 2C and 2D is that the biosensor 100B further includes a filter layer 106 disposed on the substrate 102. Specifically, the filter layer 106 is disposed between the substrate 102 and the polarizing element 108. Therefore, the photodiodes 104 can be further prevented from receiving a signal from a long wavelength of light that is out of the emission wavelength of target fluorescent dyes (e.g. IR light from the environment) in the embodiments.

Figure 4A:
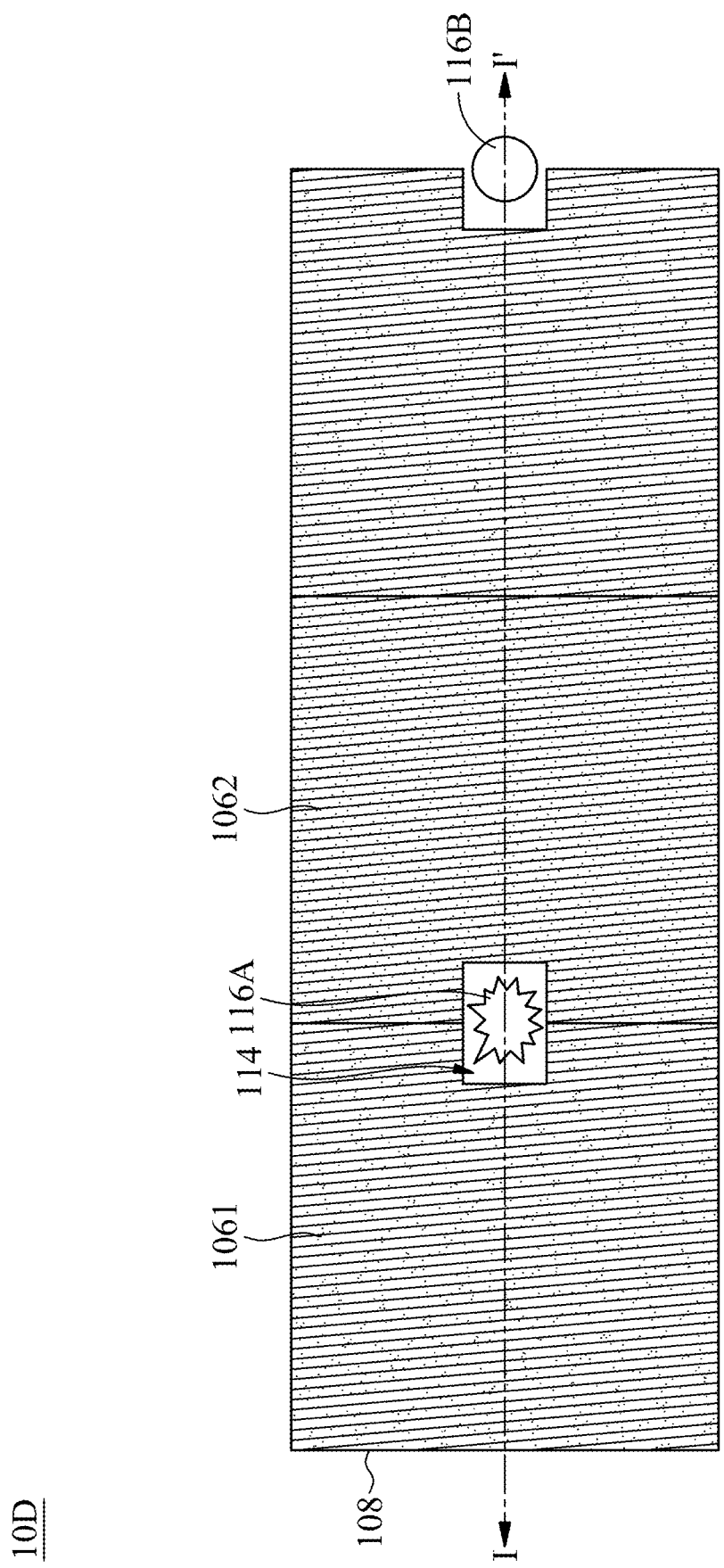
FIG. 4A illustrates a top view of a bio detection system in accordance with some embodiments.
Figure 4B:
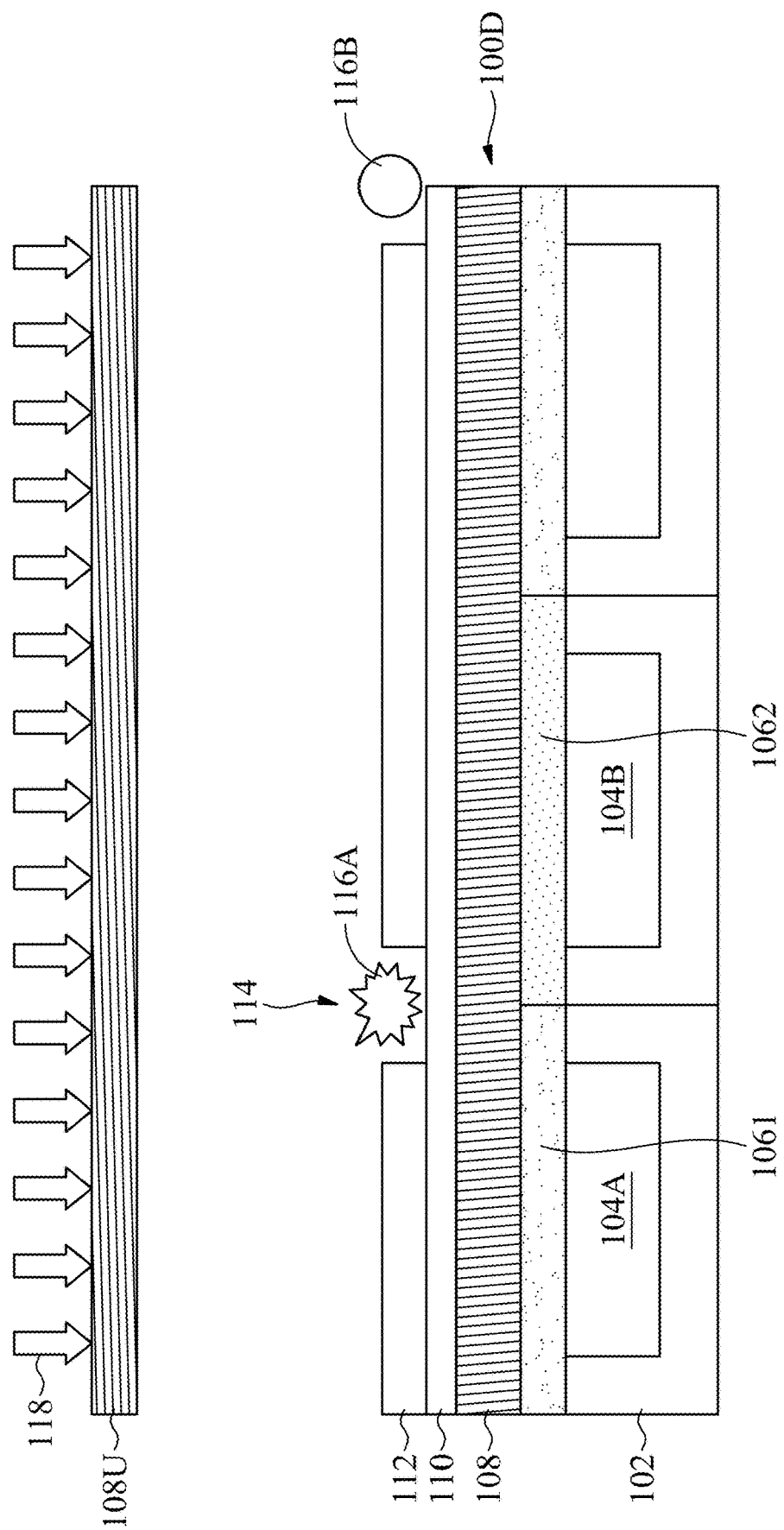
FIG. 4B illustrates a cross-sectional view taken along line I-I' of FIG. 4A.

FIG. 4A illustrates a top view of a bio detection system 10D in accordance with some embodiments. Some layers or elements may be omitted in the top view for the sake of clarity. FIG. 4B illustrates a cross-sectional view taken along line I-I' of FIG. 4A. Note that the same or similar elements or layers are denoted by like reference numerals. In some embodiments, the same or similar elements or layers denoted by like reference numerals have the same meaning and will not be repeated, for the sake of brevity.

One of the differences between FIG. 4B and FIG. 3A is that the bio detection system 10D includes a biosensor 100D. One reaction site 114 of the biosensor 100D corresponds to two photodiodes 104. The biosensor 100D includes a filter layer 106 between the substrate 102 and the polarizing element 108. In the embodiments, the filter layer 106 of the biosensor 100D includes a sub-filter layer 1061 and a sub-filter layer 1062. The sub-filter layer 1061 and the sub-filter layer 1062 correspond to a photodiode 104A and a photodiode 104B, respectively. One reaction site 114 corresponds to the photodiode 104A and the photodiode 104B.

Figure 4C:
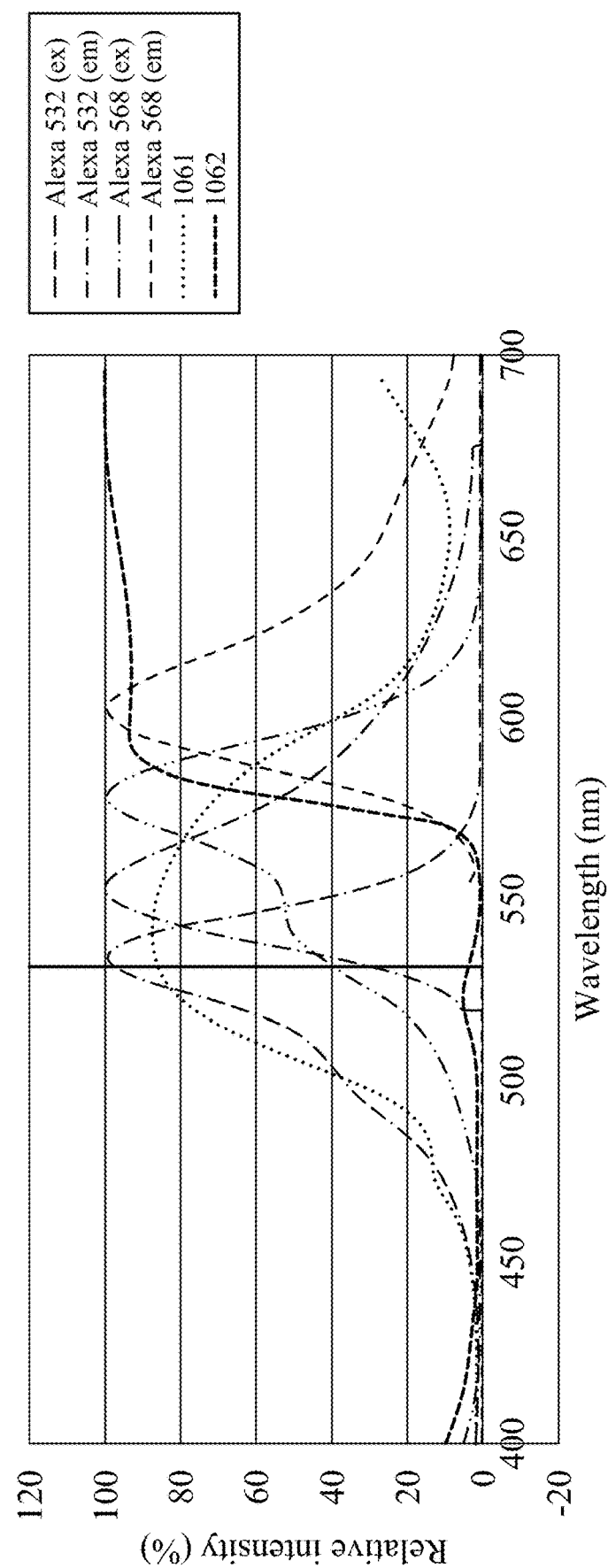
FIG. 4C illustrates a spectrum of excitation, emission, and transmission in accordance with some embodiments.

FIG. 4C illustrates a spectrum of excitation, emission, and transmission in accordance with some embodiments. In some embodiments, the sub-filter layer 1061 and the sub-filter layer 1062 are filters that allow the emission lights of the fluorescent markers on the biosamples 116A and 116B. Therefore, in the embodiments, the emission lights are distinguished by the sub-filter layers 1061 and 1062 and the signal intensities obtained by the photodiodes 104 (e.g., the photodiode 104A or the photodiode 104B). For example, two color fluorescent dyes, such as Alexa 532 and Alexa 568, may be used in a DNA sequencer to identify four nucleotides, wherein dATP is labeled with Alexa 532 (referred to as dATP-Alexa 532), dTTP is labeled with Alexa 568 (referred to as dTTP-Alexa 568), dGTP is labeled with Alexa 532 (referred to as dGTP-Alexa 532), and dCTP is labeled with Alexa 568 (referred to as dCTP-Alexa 568). Only two of the dNTPs are used in each flow cycle. Both of the Alexa 532 and Alexa 568 can be excited by a light with a wavelength of 532 nm. In the first cycle, a solution of dATP-Alexa 532, dTTP-Alexa 568, and polymerase is flowed through the bio detection system 10D. The excitation light source 118 excites the biosamples 116A and 116B with a light having a wavelength of 532 nm. If the photodiode 104A receives the emission light, it can be learned that the biosample 116A in the reaction site 114 above the photodiode 104A and 104B is bound by one dATP-Alexa 532. If the photodiode 104B receives the emission light, it can be learned that the biosample 116A in the reaction site 114 above the photodiodes 104A and 104B is bound by one dTTP-Alexa 568.

In the second cycle, a solution of dGTP-Alexa 532, dCTP-Alexa 568, and polymerase is flowed through the bio detection system 10D. The excitation light source 118 excites the biosamples 116A and 116B with a light having a wavelength of 532 nm. If the photodiode 104A receives the emission light, it can be learned that the biosample 116A in the reaction site 114 above the photodiode 104A and 104B is bound by one dGTP-Alexa 532. If the photodiode 104B receives the emission light, it can be learned that the biosample 116A in the reaction site 114 above the photodiode 104A and 104B is bound by one dCTP-Alexa 568. After about 100-600 cycles are repeated, the DNA sequences of the biosamples 116A and 116B are determined.

In the embodiments, fewer cycles are required to determine the same length of a DNA molecule compared to FIG. 2A, and less excitation light are required compared to FIGS. 2B, 2C, and 2D.

Figure 4D:
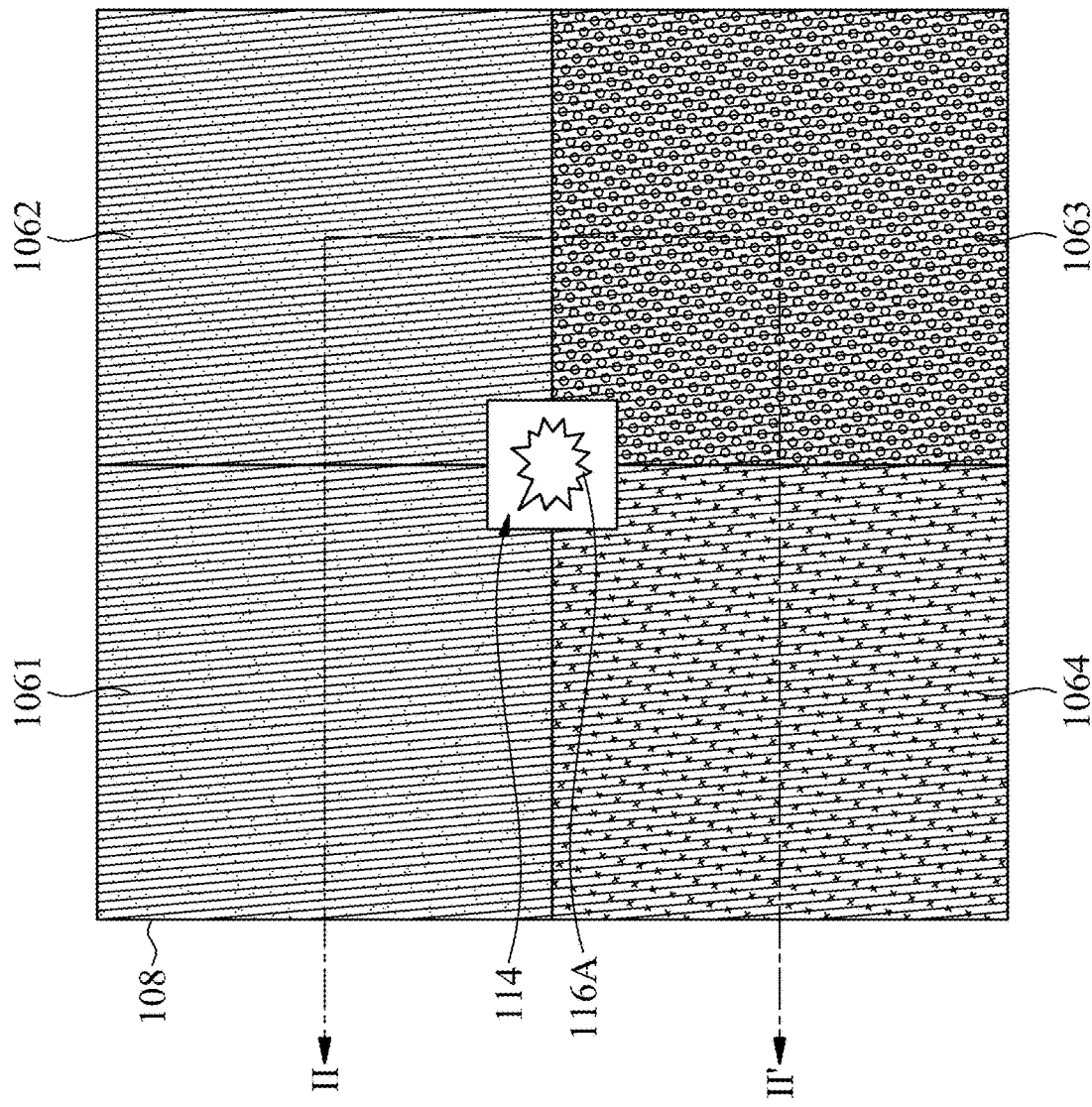
FIG. 4D illustrates a top view of a bio detection system in accordance with some embodiments.
Figure 4E:
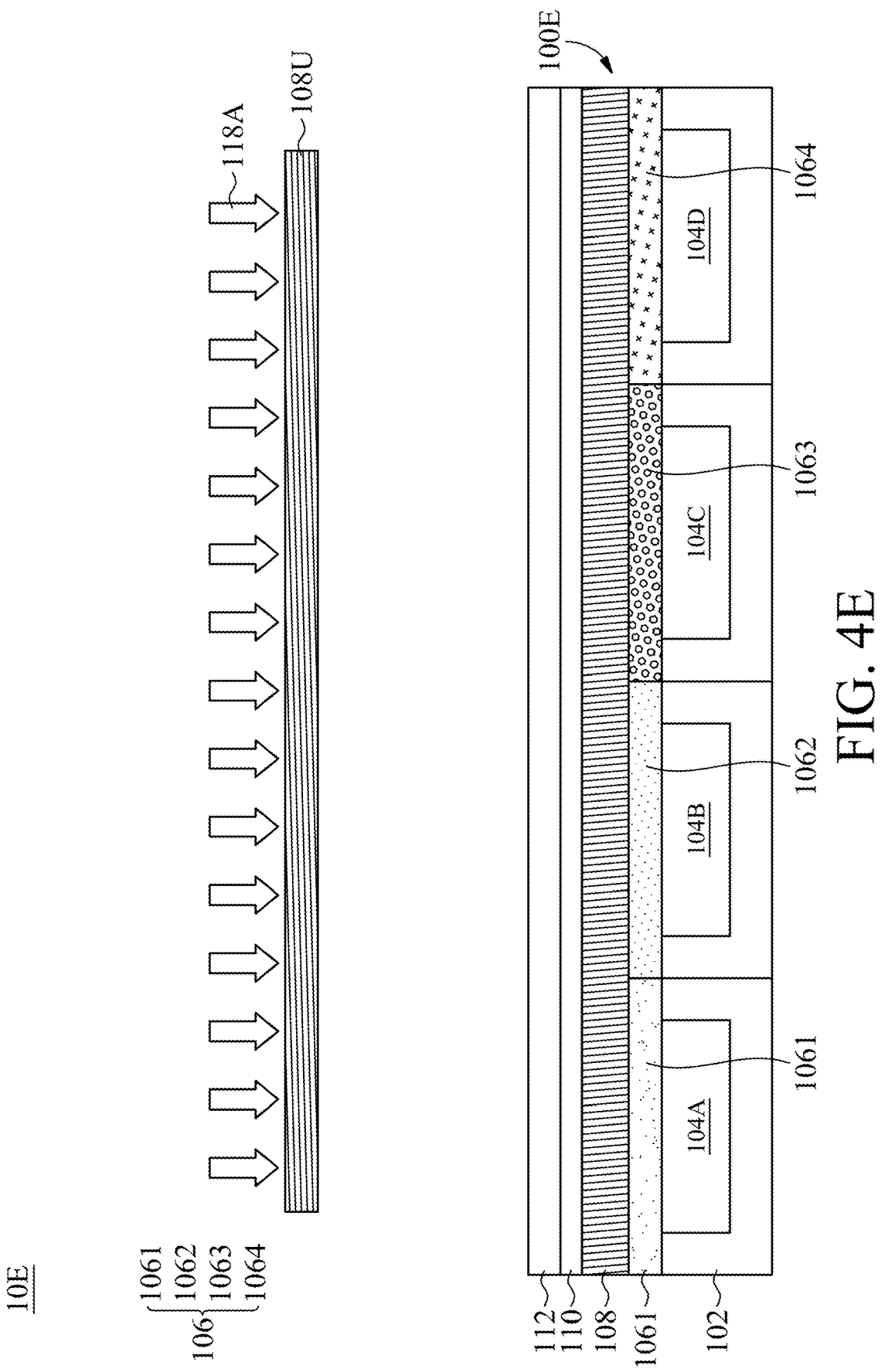
FIG. 4E illustrates a cross-sectional view taken along line II-II' of FIG. 4D.

FIG. 4D illustrates a top view of a bio detection system 10E in accordance with some embodiments. Some layers or elements may be omitted in the top view for the sake of clarity. FIG. 4E illustrates a cross-sectional view taken along line II-II' of FIG. 4D. Note that the same or similar elements or layers are denoted by like reference numerals. In some embodiments, the same or similar elements or layers denoted by like reference numerals have the same meaning and will not be repeated, for the sake of brevity.

One of the differences between FIG. 4E and FIG. 4B is that the bio detection system 10E includes a biosensor 100E. One reaction site 114 of the biosensor 100E corresponds to four photodiodes 104. In the embodiments, the filter layer 106 of the biosensor 100E includes a sub-filter layer 1061, a sub-filter layer 1062, a sub-filter layer 1063 and a sub-filter layer 1064. The sub-filter layer 1061, the sub-filter layer 1062, the sub-filter layer 1063 and the sub-filter layer 1064 correspond to a photodiode 104A, a photodiode 104B, a photodiode 104C, and a photodiode 104D, respectively. The application and description of the bio detection system 10E is similar to those described in the paragraphs relating to FIGS. 4A and 4B, which will not be repeated herein.

Figure 5A:
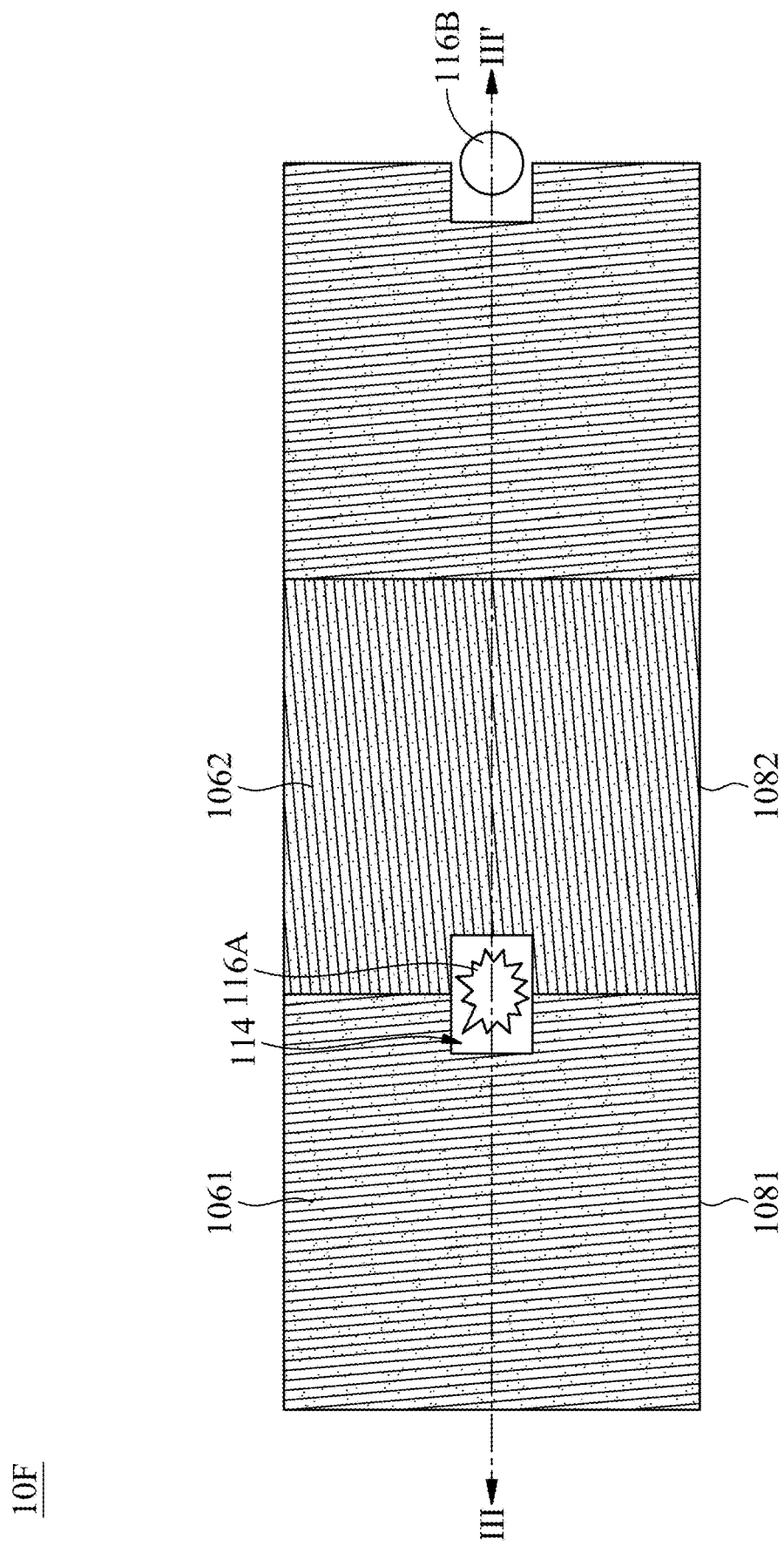
FIG. 5A illustrates a top view of a bio detection system in accordance with some embodiments.
Figure 5B:
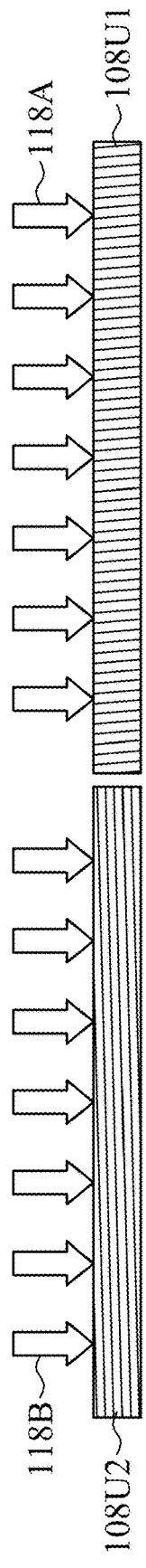
FIG. 5B illustrates a cross-sectional view taken along line III-III' of FIG. 5A.
Figure 5B:
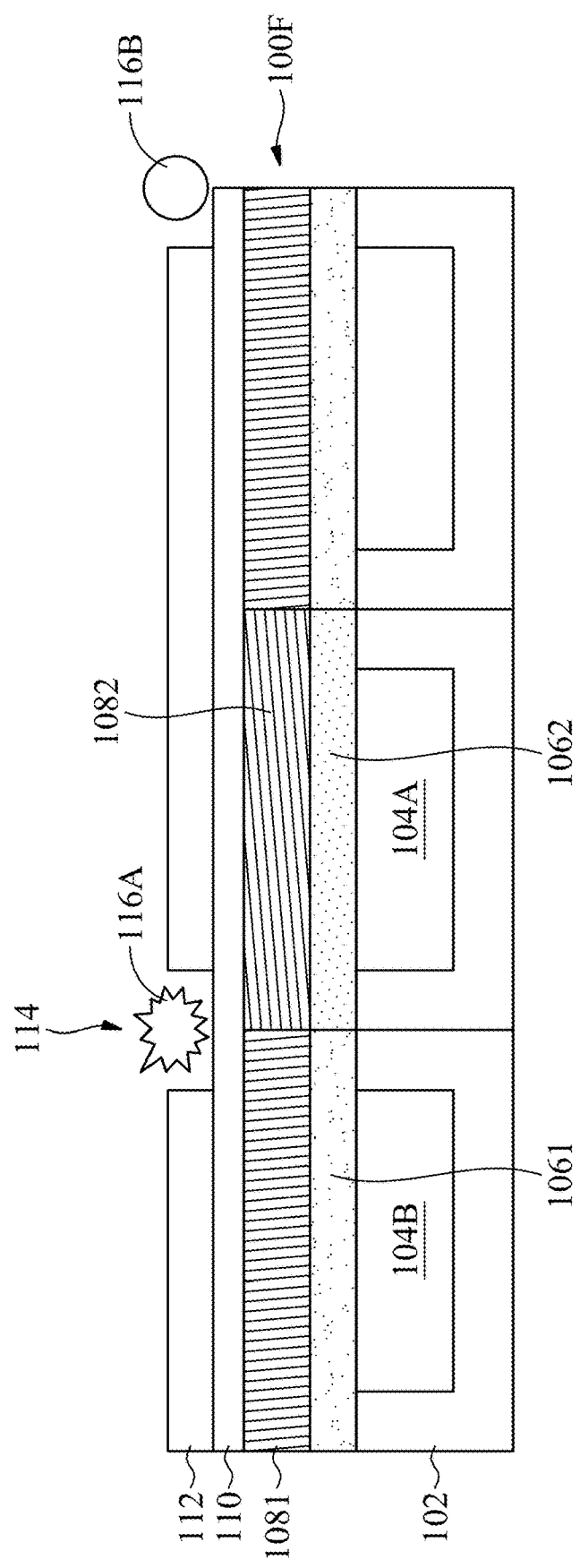

FIG. 5A illustrates a top view of a bio detection system 10F in accordance with some embodiments. Some layers or elements may be omitted in the top view for the sake of clarity. FIG. 5B illustrates a cross-sectional view taken along line III-III' of FIG. 5A. Note that the same or similar elements or layers are denoted by like reference numerals. In some embodiments, the same or similar elements or layers denoted by like reference numerals have the same meaning and will not be repeated, for the sake of brevity.

One of the differences between the FIG. 5B and FIG. 4B is that the upper polarizing element 108U of the bio detection system 10F includes a sub-upper polarizing element 108U1 and a sub-upper polarizing element 108U2. In some embodiments, the sub-upper polarizing element 108U1 is disposed adjacent to the sub-upper polarizing element 108U2. The sub-upper polarizing element 108U1 and the sub-upper polarizing element 108U2 may have different polarization angles. For example, the polarization angle of the sub-upper polarizing element 108U1 is 90 degrees and the polarization angle of the sub-upper polarizing element 108U2 is 0 degrees.

The excitation light source 118 of the bio detection system 10F includes a sub-excitation light source 118A and a sub-excitation light source 118B. The sub-excitation light source 118A emits a light that is different from the sub-excitation light source 118B. The light emitted by the sub-excitation light source 118A passes through the sub-upper polarizing element 108U1, and the light emitted by the sub-excitation light source 118B passes through the sub-upper polarizing element 108U2. The sub-excitation light source 118A and the sub-excitation light source 118B may sequentially or simultaneously emit light.

The polarizing element 108 of the biosensor 100F includes a sub-polarizing layer 1081 and a sub-polarizing layer 1082. The sub-polarizing layer 1081 and the sub-polarizing layer 1082 correspond to a photodiode 104B and a photodiode 104A, respectively. The sub-polarizing layer 1081 is disposed adjacent to the sub-polarizing layer 1082. The sub-polarizing layer 1081 and the sub-polarizing layer 1082 may have different polarization angles. For example, the polarization angle of the sub-polarizing layer 1081 is 90 degrees, and the polarization angle of the sub-polarizing layer 1082 is 0 degrees.

The filter layer 106 of the biosensor 100F includes a sub-filter layer 1061 and a sub-filter layer 1062. The sub-filter layer 1061 prevents the photodiode from receiving the light emitted by the sub-excitation light source 118A. The sub-filter layer 1062 prevents the photodiode from receiving the light emitted by the sub-excitation light source 118B. It should be appreciated that the sub-filter layers are designed essentially according to the polarizing element and the upper polarizing element.

Figure 5C:
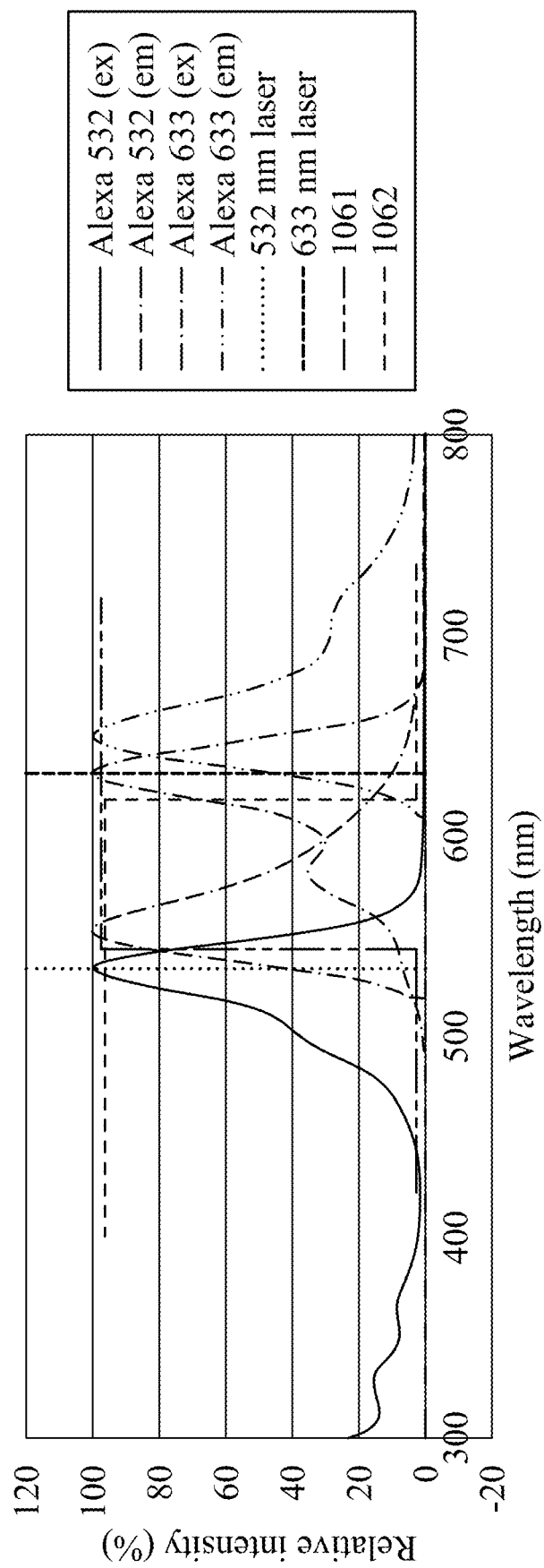
FIG. 5C illustrates a spectrum of excitation, emission, and transmission in accordance with some embodiments.

FIG. 5C illustrates a spectrum of excitation, emission, and transmission in accordance with some embodiments. Excitation is represented by ex. Emission is represented by em. In the embodiments, the fluorescent markers Alexa 532 and Alexa 633 are used. The sub-excitation light source 118A emits a light with a wavelength of 532 nm, and the sub-excitation light source 118B emits a light with a wavelength of 633 nm. The biosample 116A is taken as an example. When both of the photodiodes 104A and 104B obtain signals, it can be learned that the biosample 116A is labeled with Alexa 532. When only photodiode 104B obtain a signal, it can be learned that the biosample 116A is labeled with Alexa 633. The biosample 116B can also be analyzed according to the similar concept.

Typically, it is very difficult to design a single filter that can blocks multiple excitation lights, such as a dual or multi notch filter, and such filter is always very thick, making the receiving signal weaker and the crosstalk stronger. In the embodiments, multiple excitation lights can be blocked by the polarizing elements. Therefore, the filter can be an edge pass filter, which is easy to design. In addition, the filter can be combined with a dielectric interference filter, an absorption color filter or a combination thereof, which makes the process even easier.

Figure 6A:
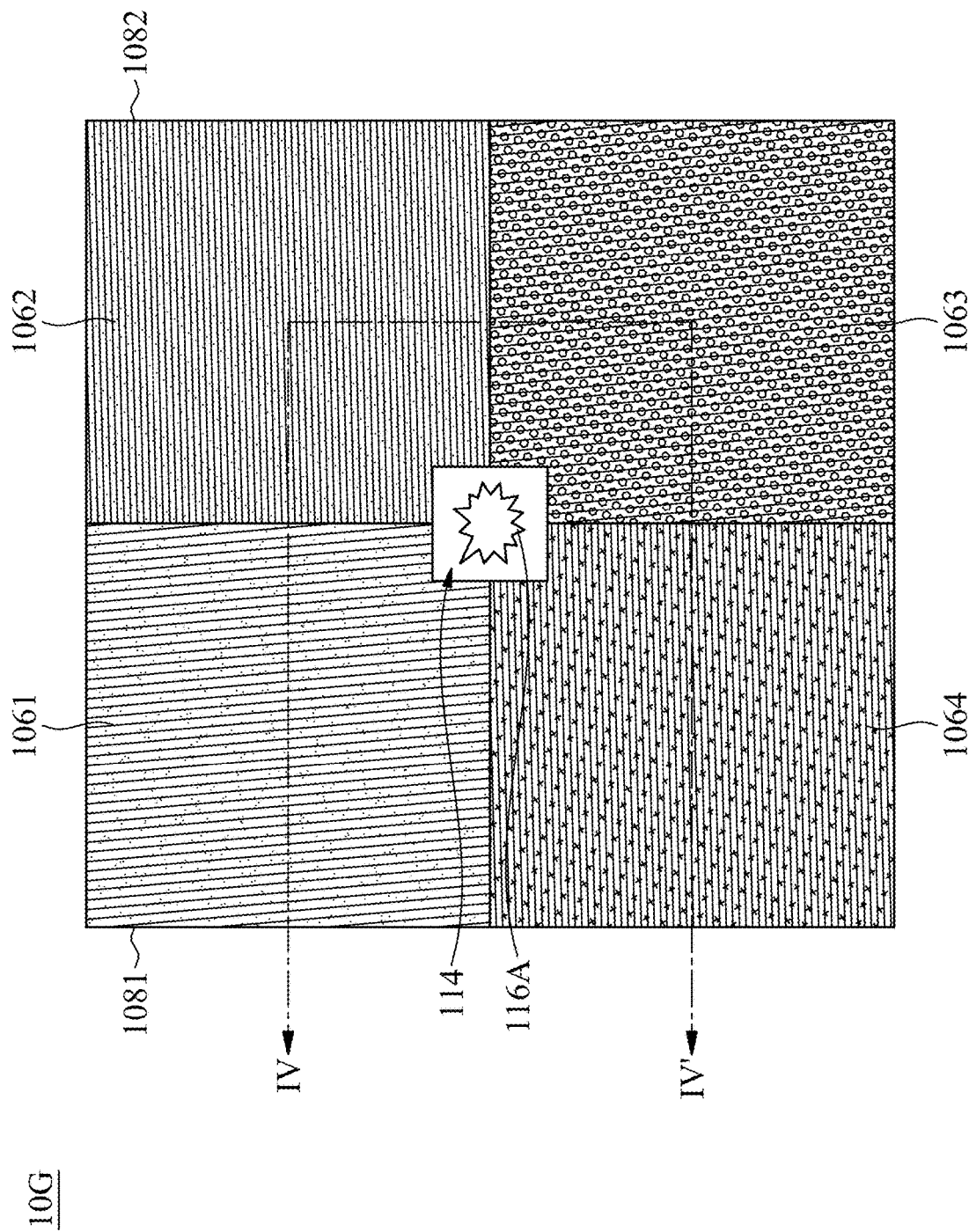
FIG. 6A illustrates a top view of a bio detection system in accordance with some embodiments.
Figure 6B:
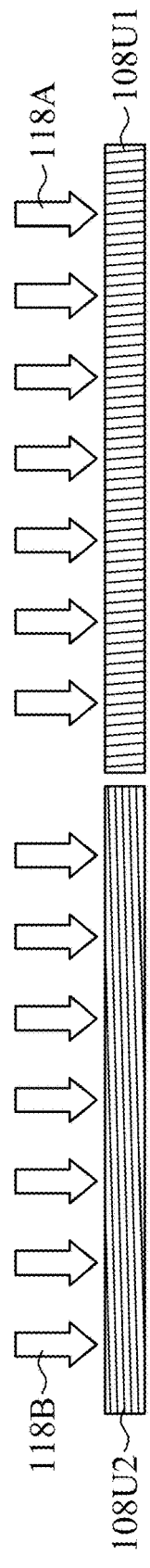
FIG. 6B illustrates a cross-sectional view taken along line IV-IV' of FIG. 6A.
Figure 6B:
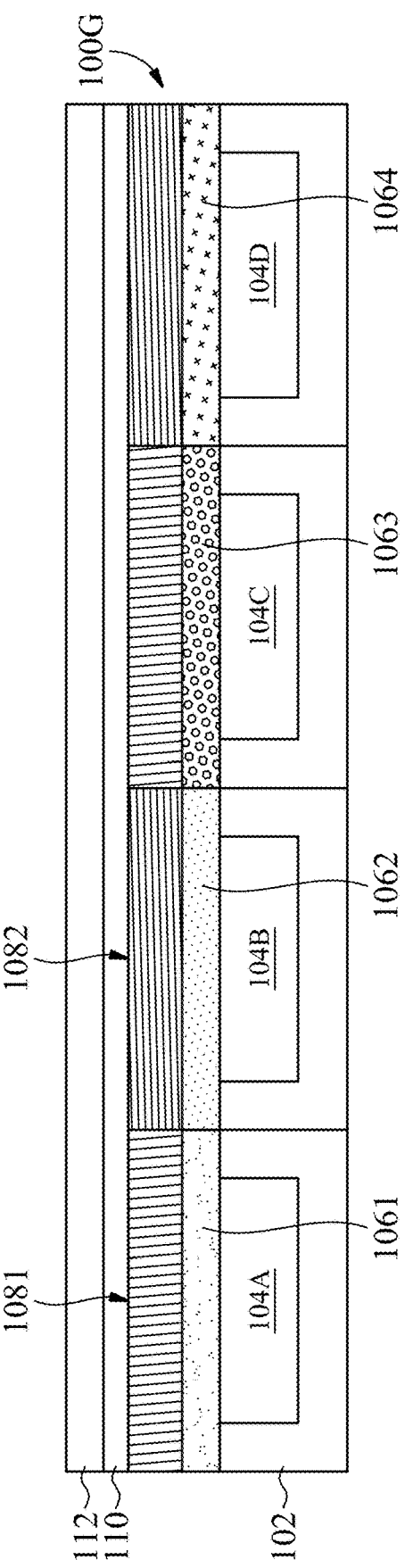

FIG. 6A illustrates a top view of a bio detection system 10G in accordance with some embodiments. Some layers or elements may be omitted in the top view for the sake of clarity. FIG. 6B illustrates a cross-sectional view taken along line IV-IV' of FIG. 6A. Note that the same or similar elements or layers are denoted by like reference numerals. In some embodiments, the same or similar elements or layers denoted by like reference numerals have the same meaning and will not be repeated, for the sake of brevity.

One of the differences between the FIG. 6B and FIG. 4E is that the polarizing element 108 of the biosensor 100G includes the sub-polarizing layer 1081 and the sub-polarizing layer 1082. The filter layer 106 of the biosensor 100G includes a sub-filter layer 1061, a sub-filter layer 1062, a sub-filter layer 1063 and a sub-filter layer 1064. The sub-filter layers 1061 and 1063 prevent the photodiodes from receiving the light emitted by the sub-excitation light source 118A. The sub-filter layers 1062 and 1064 prevent the photodiodes from receiving the light emitted by the sub-excitation light source 118B. It should be appreciated that the sub-filter layers are designed essentially according to the polarizing element and the upper polarizing element.

Figure 6C:
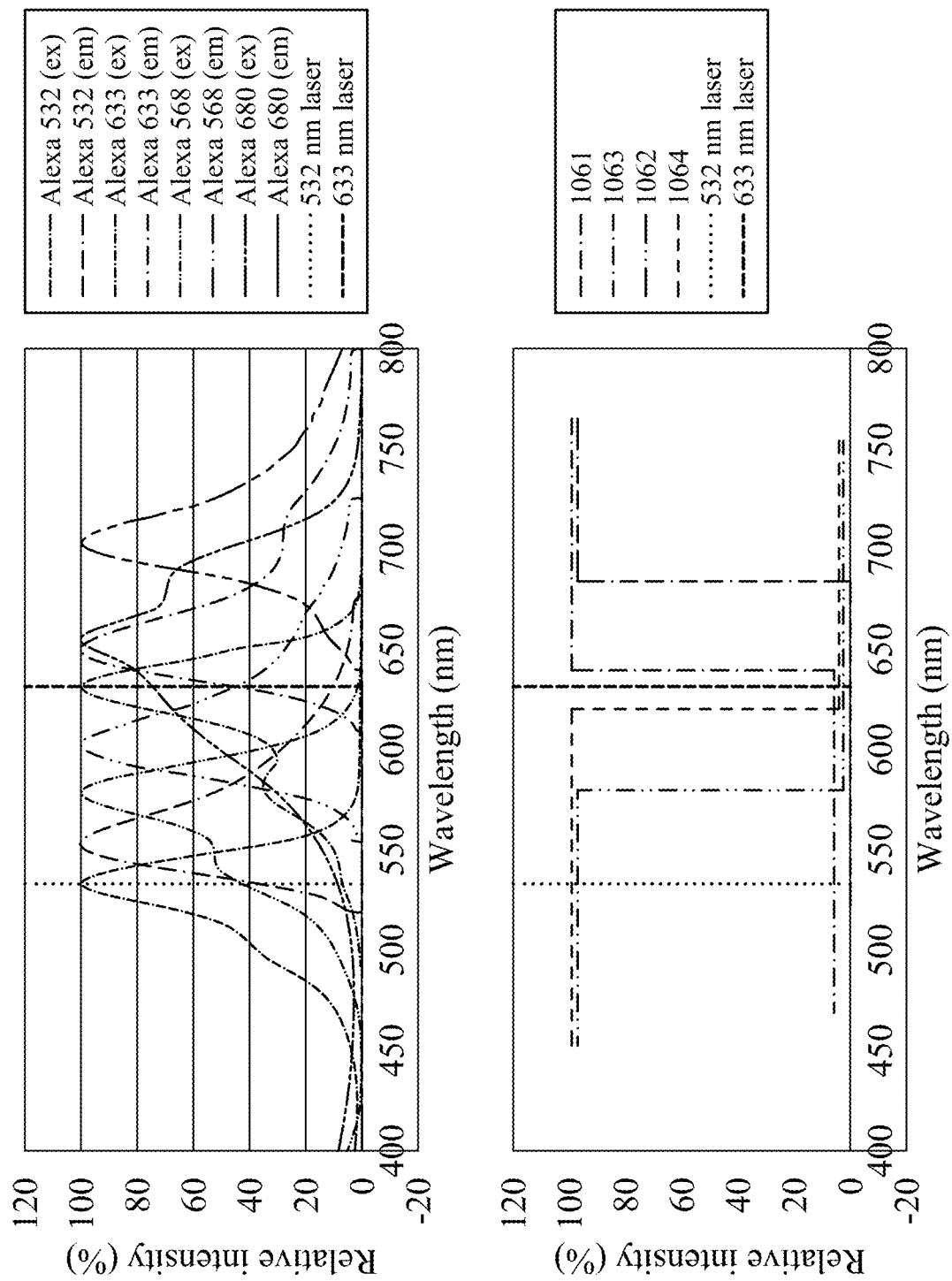
FIG. 6C illustrates a spectrum of excitation, emission, and transmission in accordance with some embodiments.

FIG. 6C illustrates a spectrum of excitation, emission, and transmission in accordance with some embodiments. Excitation is represented by ex. Emission is represented by em. In the embodiments, the fluorescent markers Alexa 532, Alexa 568, Alexa 633 and Alexa 680 are used. The sub-excitation light source 118A emits a light with a wavelength of 532 nm, and the sub-excitation light source 118B emits a light with a wavelength of 633 nm. The application and description of the bio detection system 10G is similar to those described in the paragraphs relating to FIG. 5A to 5C, which will not repeated herein.

Figure 6D:
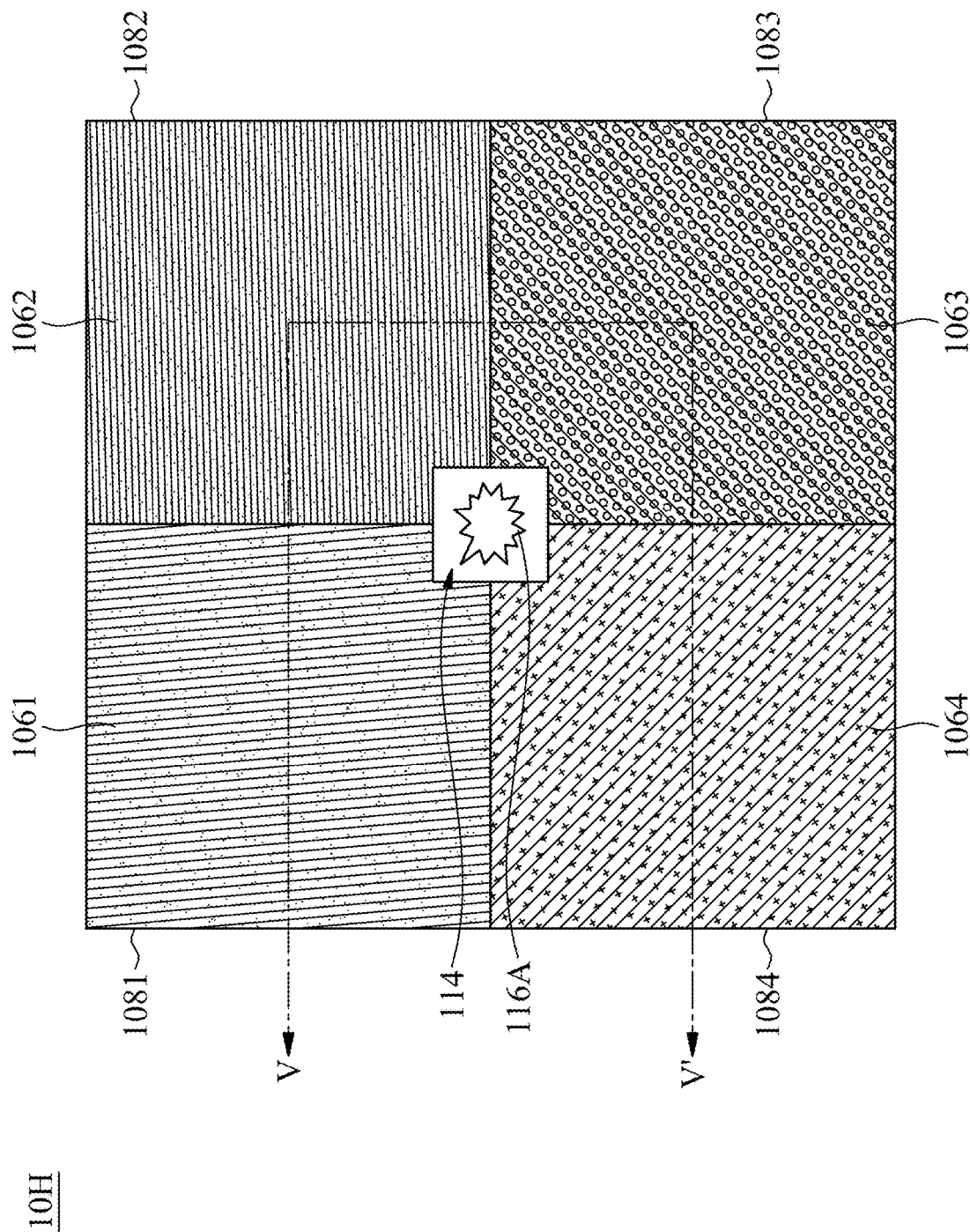
FIG. 6D illustrates a top view of a bio detection system in accordance with some embodiments.
Figure 6E:
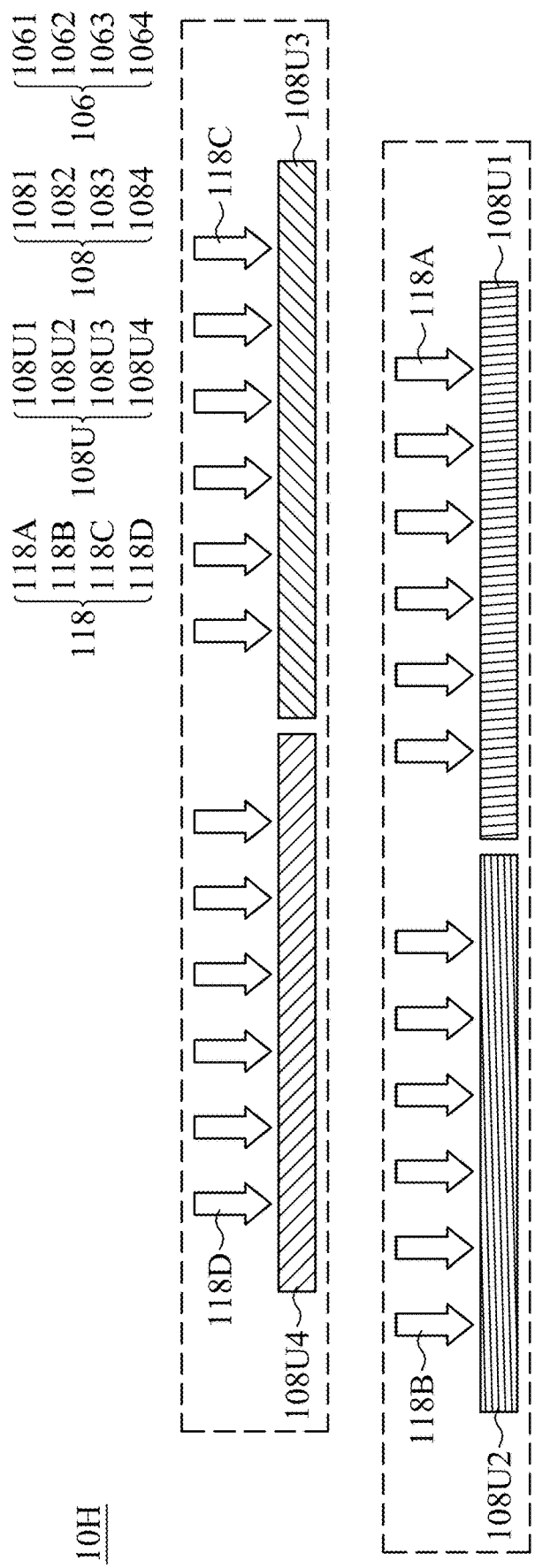
FIG. 6E illustrates a cross-sectional view taken along line V-V' of FIG. 6D.
Figure 6E:
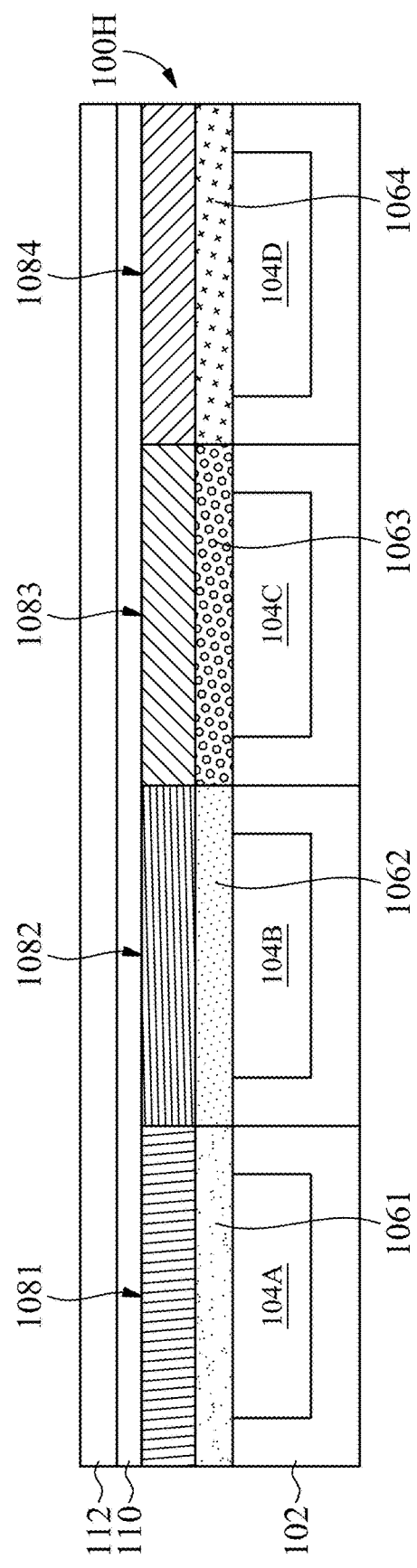

FIG. 6D illustrates a top view of a bio detection system 10H in accordance with some embodiments. Some layers or elements may be omitted in the top view for the sake of clarity. FIG. 6E illustrates a cross-sectional view taken along line V-V' of FIG. 6D. Note that the same or similar elements or layers are denoted by like reference numerals. In some embodiments, the same or similar elements or layers denoted by like reference numerals have the same meaning and will not be repeated, for the sake of brevity.

One of the differences between FIG. 6E and FIG. 6B is that the upper polarizing element 108U of the bio detection system 10H includes a sub-upper polarizing element 108U1, a sub-upper polarizing element 108U2, a sub-upper polarizing element 108U3 and a sub-upper polarizing element 108U4. The sub-upper polarizing elements 108U1, 108U2, 108U3 and 108U4 may have polarization angles that are different from each other. For example, the polarization angle of the sub-upper polarizing element 108U1 is 90 degrees, the polarization angle of the sub-upper polarizing element 108U2 is 0 degrees, the polarization angle of the sub-upper polarizing element 108U3 is 45 degrees, and the polarization angle of the sub-upper polarizing element 108U4 is 135 degrees.

The excitation light source 118 of the bio detection system 10H emits a sub-excitation light source 118A, a sub-excitation light source 118B, a sub-excitation light source 118C and a sub-excitation light source 118D. The sub-excitation light sources 118A, 118B, 118C and 118D emit lights that are different from each other. The light emitted by the sub-excitation light source 118A passes through the sub-upper polarizing element 108U1, the light emitted by the sub-excitation light source 118B passes through the sub-upper polarizing element 108U2, the light emitted by the sub-excitation light source 118C passes through the sub-upper polarizing element 108U3, and the light emitted by the sub-excitation light source 118D passes through the sub-upper polarizing element 108U4. The sub-excitation light sources 118A and 118B are used first, and then the sub-excitation light sources 118C and 118D are used.

The polarizing element 108 includes of the biosensor 100H includes a sub-polarizing element 1081, a sub-polarizing element 1082, a sub-polarizing element 1083 and a sub-polarizing element 1084. The sub-polarizing elements 1081, 1082, 1083 and 1084 may have polarization angles that are different from each other. For example, the polarization angle of the sub-polarizing element 1081 is 90 degrees, the polarization angle of the sub-polarizing element 1082 is 0 degrees, the polarization angle of the sub-polarizing element 1083 is 45 degrees, and the polarization angle of the sub-polarizing element 1084 is 135 degrees.

Figure 6F:
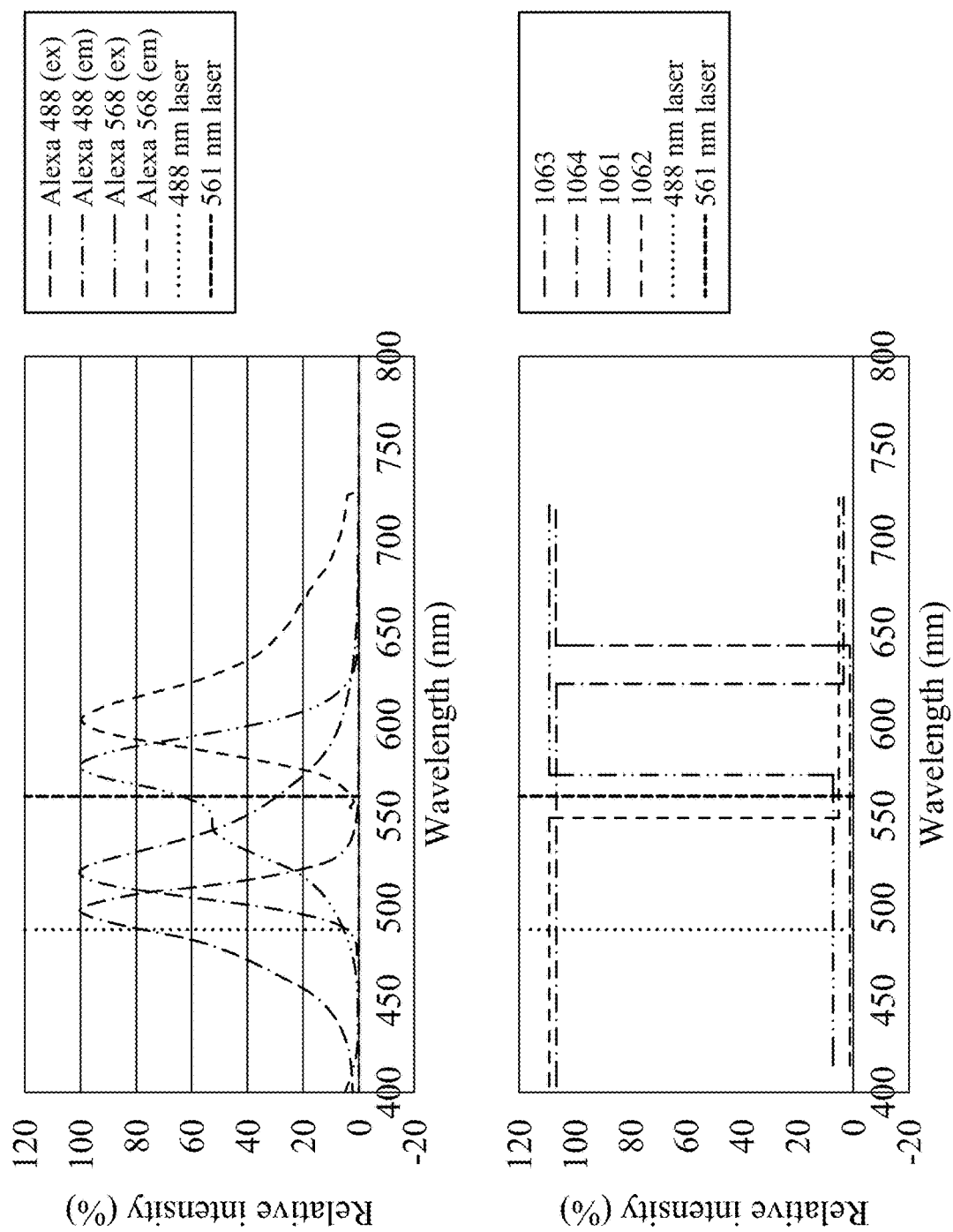
FIG. 6F illustrates spectrums of excitation, emission, and transmission in accordance with some embodiments.
Figure 6G:
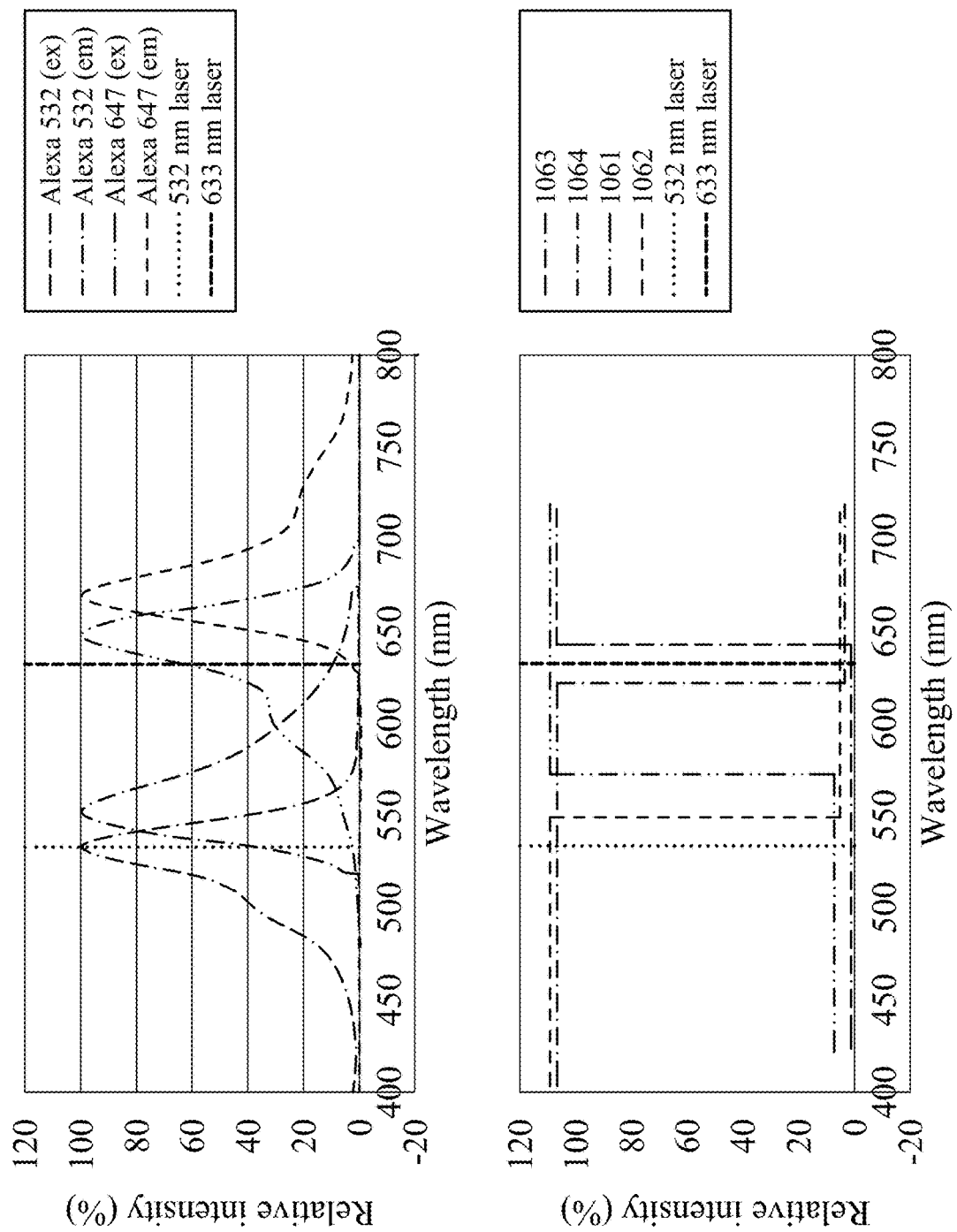
FIG. 6G illustrates spectrums of excitation, emission, and transmission in accordance with some embodiments.

FIGS. 6F and 6G illustrate spectrums of excitation, emission, and transmission in accordance with some embodiments. Excitation is represented by ex. Emission is represented by em. In the embodiments, the fluorescent markers Alexa 488, Alexa 568, Alexa 532 and Alexa 647 are used. The sub-excitation light source 118A emits a light with a wavelength of 488 nm, the sub-excitation light source 118B emits a light with a wavelength of 561 nm, the sub-excitation light source 118C emits a light with a wavelength of 532 nm, and the sub-excitation light source 118D emits a light with a wavelength of 633 nm. The application and description of the bio detection system 10H is similar to those described in the paragraphs relating to FIG. 5A to 5C.

When the sub-excitation light sources 118A and 118B are used, only photodiodes 104A and 104B are turned on. When the sub-excitation light sources 118C and 118D are used, only photodiodes 104C and 104D are turned on. If the photodiode 104A obtains a signal, it can be learned that the biosample 116A is labeled with Alexa 568. If the photodiode 104B obtains a signal, it can be learned that the biosample 116A is labeled with Alexa 488. If the photodiode 104C obtains a signal, it can be learned that the biosample 116A is labeled with Alexa 647. If the photodiode 104D obtains a signal, it can be learned that the biosample 116A is labeled with Alexa 532. In the embodiments, the intensities of the obtained signals are substantially the same, making the analysis of the signals easier.

Compared with the prior art, the biosensor and the bio detection system provided by the embodiments of the present invention have one or more of the following advantages:

(1) The photodiode can be prevented from receiving the excitation light by using the upper polarizing element and the polarizing element.

(2) Instead of designing various biosensors or bio detection systems that target various excitation lights, one biosensor or one bio detection system of the present invention is enough to block various excitation lights.

(3) Since one biosensor or one bio detection system is enough to block various excitation lights, the excitation lights with various wavelengths can be used. The fluorescent markers can be excited by respective optimum excitation light. Therefore, the intensities of the obtained signals are substantially the same, making the analysis of the signals easier.

Although some embodiments of the present invention and their advantages have been described in detail, it should be understood that various changes, substitutions and alterations can be made herein without departing from the spirit and scope of the invention as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and operations described in the specification. As one of ordinary skill in the art will readily appreciate from the disclosure of the present disclosure, processes, machines, manufacture, compositions of matter, means, methods, or operations, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or operations.

What is claimed is:

1. A biosensor, comprising:
    a substrate;
    a plurality of photodiodes embedded in the substrate;
    a polarizing element disposed on the substrate; and
    a sample isolation layer disposed on the polarizing element, wherein the sample isolation layer has a plurality of openings as reaction sites.

2. The biosensor as claimed in claim 1, further comprising:
    a filter layer disposed between the substrate and the polarizing element.

3. The biosensor as claimed in claim 1, further comprising:
    a filter layer disposed between the substrate and the reaction sites, wherein the polarizing element is embedded in the filter layer.

4. The biosensor as claimed in claim 1, wherein each of the reaction sites corresponds to one of the plurality of the photodiodes.

5. The biosensor as claimed in claim 2, wherein the filter layer comprises two sub-filter layers, and each of the reaction sites corresponds to two of the plurality of the photodiodes.

6. The biosensor as claimed in claim 2, wherein the filter layer comprises four sub-filter layers, and each of the reaction sites corresponds to four of the plurality of the photodiodes.

7. The biosensor as claimed in claim 2, wherein the filter layer comprises two sub-filter layers, the polarizing element comprises two sub-polarizing layers, and each of the reaction sites corresponds to two of the plurality of the photodiodes.

8. The biosensor as claimed in claim 2, wherein the filter layer comprises four sub-filter layers, the polarizing element comprises two sub-polarizing layers, and each of the reaction sites corresponds to four of the plurality of the photodiodes.

9. The biosensor as claimed in claim 2, wherein the filter layer comprises four sub-filter layers, the polarizing element comprises four sub-polarizing layers, and each of the reaction sites corresponds to four of the plurality of the photodiodes.

10. The biosensor as claimed in claim 1, further comprising:
    a planarization layer disposed between the reaction sites and the polarizing element.

11. A bio detection system, comprising:
    a substrate;
    a plurality of photodiodes embedded in the substrate;
    a polarizing element disposed on the substrate;
    a sample isolation layer disposed on the polarizing element, wherein the sample isolation layer has a plurality of openings as reaction sites;
    an upper polarizing element disposed on the reaction site; and
    an excitation light source disposed on the upper polarizing element and emitting an excitation light that passes through the upper polarizing element.

12. The bio detection system as claimed in claim 11, further comprising:
    a filter layer disposed between the substrate and the polarizing element.

13. The bio detection system as claimed in claim 11, further comprising:
    a filter layer disposed between the substrate and the reaction sites, wherein the polarizing element is embedded in the filter layer.

14. The bio detection system as claimed in claim 11, wherein each of the reaction sites corresponds to one of the plurality of the photodiodes.

15. The bio detection system as claimed in claim 12, wherein the filter layer comprises at least two sub-filter layers, and each of the reaction sites corresponds to at least two of the plurality of the photodiodes.

16. The bio detection system as claimed in claim 15, wherein the upper polarizing element comprises at least two sub-upper polarizing layers, and the polarizing element comprises at least two sub-polarizing layers.

17. The bio detection system as claimed in claim 11, further comprising:
    a planarization layer disposed between the reaction sites and the polarizing element.

18. The bio detection system as claimed in claim 11, wherein the excitation light source comprises a plurality of sub-excitation light sources.

19. The bio detection system as claimed in claim 18, wherein the plurality of sub-excitation light sources emit lights sequentially or in groups.

20. The bio detection system as claimed in claim 11, wherein the excitation light source is a monochromator.

* * * * *